US011644987B2

(12) United States Patent
Zhao

(10) Patent No.: US 11,644,987 B2
(45) Date of Patent: May 9, 2023

(54) DYNAMIC CHANNEL MAPPING FOR A MEMORY SYSTEM

(71) Applicant: Micron Technology, Inc., Boise, ID (US)

(72) Inventor: Yi Zhao, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/982,483

(22) PCT Filed: Aug. 23, 2019

(86) PCT No.: PCT/CN2019/102336
§ 371 (c)(1),
(2) Date: Sep. 18, 2020

(87) PCT Pub. No.: WO2021/035435
PCT Pub. Date: Mar. 4, 2021

(65) Prior Publication Data
US 2022/0206695 A1    Jun. 30, 2022

(51) Int. Cl.
*G06F 3/06* (2006.01)
*G06F 13/16* (2006.01)
(52) U.S. Cl.
CPC .......... *G06F 3/0631* (2013.01); *G06F 3/0604* (2013.01); *G06F 3/0673* (2013.01); *G06F 13/1668* (2013.01)
(58) Field of Classification Search
CPC .... G06F 3/0631; G06F 3/0604; G06F 3/0673; G06F 13/1668; G06F 13/1684
See application file for complete search history.

(56) References Cited

U.S. PATENT DOCUMENTS 6,260,127 B1 * 7/2001 Olarig ................. G06F 13/1694
                                                        711/170
9,146,890 B1 * 9/2015 Brown ................ G06F 13/4022
(Continued)

FOREIGN PATENT DOCUMENTS

CN          104011697          8/2014

OTHER PUBLICATIONS

"PC SDRAM Serial Presence Detect (SPD) Specification", Nov. 1999, Intel Corporation, Revision 1.2B, p. 7, Web page <https://cdn.hackaday.io/files/10119432931296/Spdsd12b.pdf>, retrieved on Aug. 8, 2022. (Year: 1999).*
(Continued)

*Primary Examiner* — Charles Rones
*Assistant Examiner* — Tong B. Vo
(74) *Attorney, Agent, or Firm* — Holland & Hart LLP

(57) ABSTRACT

Methods, systems, and devices for dynamic channel mapping for a memory system are described. In one example, the memory system may include a memory device having a first set of pins that are associated with a channel, and a host device, coupled with the memory device, having a second set of pins that are associated with the channel. The host device may include a controller configured to receive signaling from the memory device for a channel mapping operation, determine a channel mapping (e.g., a mapping of pins, a mapping between pins of the channel and information positions of the channel) based at least in part on the received signaling, and communicate information with the memory device via the channel based at least in part on the determined channel mapping.

25 Claims, 14 Drawing Sheets

(56) References Cited

U.S. PATENT DOCUMENTS

| | | | |
|---|---|---|---|
| 2012/0239900 A1* | 9/2012 | Nautiyal | G06F 13/1668 |
| | | | 711/170 |
| 2013/0111099 A1 | 5/2013 | Nie et al. | |
| 2013/0258755 A1 | 10/2013 | Kollipara et al. | |
| 2015/0095547 A1* | 4/2015 | Bains | G06F 3/0635 |
| | | | 711/5 |
| 2018/0011806 A1* | 1/2018 | Hsu | G06F 13/1694 |
| 2019/0339880 A1* | 11/2019 | Jiang | G06F 3/0659 |
| 2022/0156207 A1* | 5/2022 | Linstadt | G06F 13/1694 |
| | | | 711/170 |

OTHER PUBLICATIONS

ISA/CN, "International Search Report & Written Opinion," issued in connection with International Patent Application No. PCT/CN2019/102336, dated May 21, 2020 (9 pages).

* cited by examiner

DYNAMIC CHANNEL MAPPING FOR A MEMORY SYSTEM

CROSS REFERENCE

The present Application for Patent is a 371 national phase of and claims priority to and the benefit of International Patent Application No. PCT/CN2019/102336 by Zhao, entitled "DYNAMIC CHANNEL MAPPING FOR A MEMORY SYSTEM," filed Aug. 23, 2019, which is assigned to the assignee hereof and expressly incorporated by reference herein.

BACKGROUND

The following relates generally to a system that includes at least one memory device and more specifically to dynamic channel mapping for a memory system.

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

In some applications, a memory device may be included as part of, or be otherwise associated with (e.g., coupled with, controlled by) a host device. A host device and a memory device may be configured for communications via one or more channels associated with a plurality of signal paths (e.g., conductive paths, conductive interfaces, pins). Host devices and memory devices may be configured with different arrangements of pins for supporting communications via a channel.

DETAILED DESCRIPTION

Figure 1:
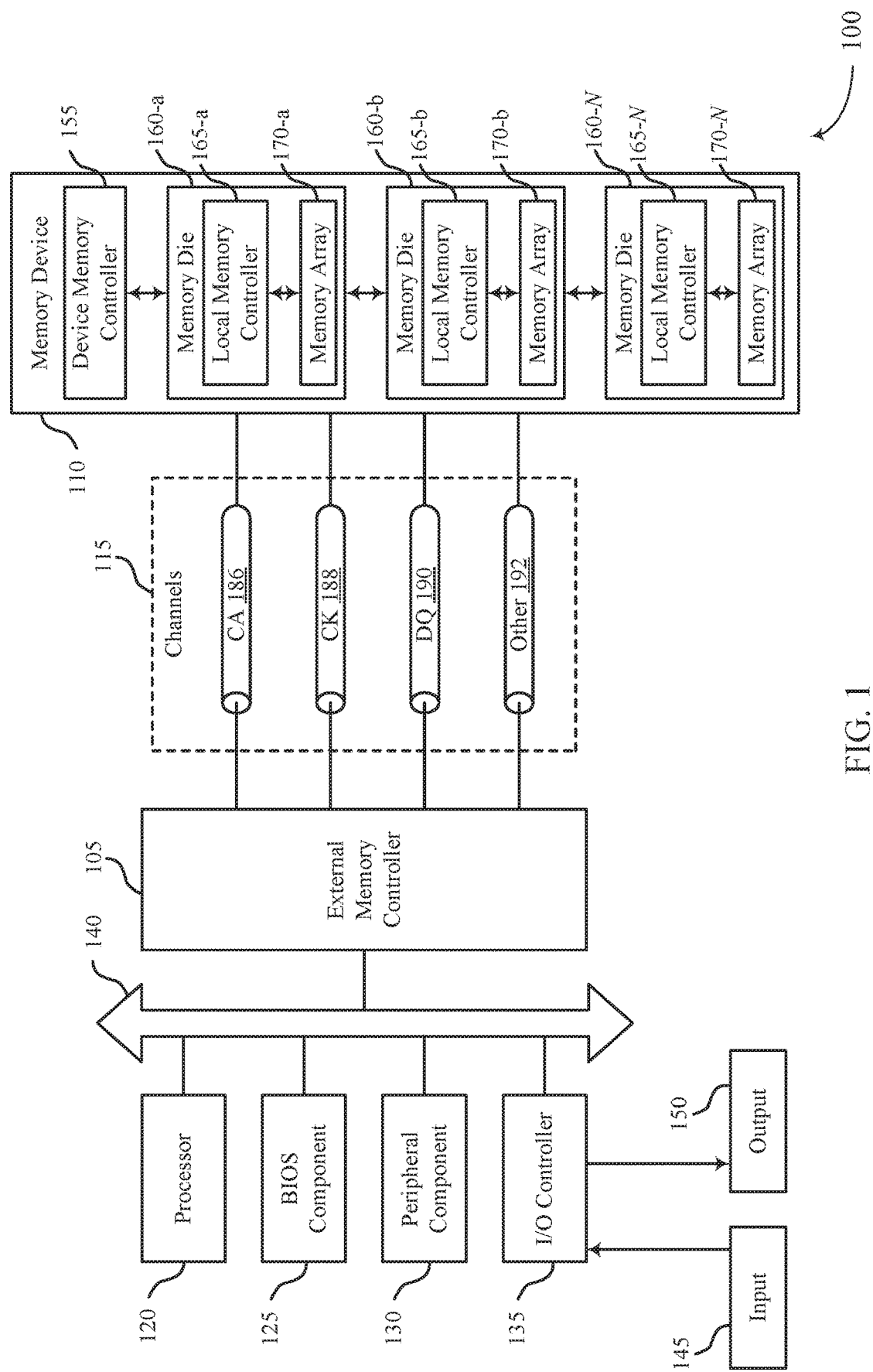
FIG. 1 illustrates an example of a system that supports dynamic channel mapping for a memory system in accordance with examples as disclosed herein.

In some systems that include a memory device and a host device (e.g., a device that uses the memory device to store information), a channel, such as a data channel, may be configured for communicating information between the memory device and the host device. Channels may be associated with a plurality of signal paths at each of the memory device and the host device, and the respective signal paths may be coupled via physical pins or other physical interfaces (e.g., conductive interfaces, communicative interfaces, connectors, solder pads, input/output buses) between the memory device and the host device. In some examples, respective signal paths may be associated with a particular information position or logical pin of a channel, which may be referred to as a bit position, an information or bit index, or other terminology indicating a position or order for which signaling carried via one signal path may be considered or interpreted relative to signaling carried via another signal path. For example, relating to a given channel, one signal path may be configured for carrying a more-significant bit or a less significant bit than another signal path.

To support communication of information between a memory device and a host device, the memory device and the host device may each need to be configured with or according to a common definition of which portions of information of a channel are carried on a particular signal path or interfacing physical pin. For example, according to certain memory standards, including but not limited to low-power memory standards such as Joint Electron Device Engineering Council (JEDEC) low power double data rate (LPDDR) standards or other standards, certain outputs (e.g., mode register read (MRR) outputs) may be fixed, such that pin swapping on a data channel (e.g., DQ swapping) without a corresponding remapping may lead to improper communication of information between a memory device and a host device.

Some systems may rely on a host device and a memory device being preconfigured with a static pin mapping or static assignment of information positions or logical pins to particular physical pins of the respective device. However, a particular pin mapping or assignment of information positions to physical pins may be unfavorable in some designs of a host device, of a memory device, or of a system that includes a host device a memory device. For example, in some designs, certain pin assignments or layouts may be more or less susceptible to cross-talk interference, may support relatively favorable or unfavorable physical layouts (e.g., routing of traces of a circuit or a printed circuit board (PCB)), or may have other design, manufacturing, complexity, or operational advantages or disadvantages.

In accordance with examples as disclosed herein, a memory system may be configured to convey signaling that supports dynamic channel mapping, such as a dynamic mapping between pins of a host device and pins of a memory device, or a dynamic mapping or assignment of physical pins of a memory device or host device to different information positions or logical pins (e.g., logical positions, information indices, sequential ordering) of a channel. In one example, a system may include a memory device having a first set of pins (e.g., physical pins, logical pins) that are associated with a data channel, and a host device, coupled with the memory device, having a second set of pins (e.g., physical pins, logical pins) that are associated with the data channel. The host device may include a controller or other circuitry configured to receive signaling from the memory device for a channel mapping operation over one or more of the second set of pins, and determine, based at least in part on the received signaling, a mapping between a pin of the second set of pins and a respective one of the first set of pins. The system may thus be configured to communicate information (e.g., between the host device and the memory device) via the data channel based at least in part on the determined mapping (e.g., a dynamic mapping, based on the particular coupling between the memory device and the host device). In some examples, the described techniques may support a host device being able to communicate with memory devices having different channel mapping (e.g., one of multiple mappings between information positions or logical pins of a channel and physical pins or other interfaces of the channel), which may improve the performance or flexibility of a system that includes the host device and various memory devices.

Features of the disclosure are initially described in the context of a memory system and memory die as described with reference to FIGS. 1 and 2. Features of the disclosure are described in the context of systems and mapping operations as described with reference to FIGS. 3-6. These and other features of the disclosure are further illustrated by and described with reference to apparatuses and flowcharts that relate to dynamic channel mapping for a memory system as described with references to FIGS. 7-10.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include portions of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, a vehicle, a vehicle controller, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different physical or logical pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose graphic processing unit (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input devices 145 may represent a device or signal external to the system 100 that provides information, signals, or data to the system 100 or its components. This may include a user interface or interface with or between other devices. In some cases, the input devices 145 may be a peripheral that interfaces with system 100 via one or more peripheral components 130 or may be managed by the I/O controller 135.

The output devices 150 may represent a device or signal external to the system 100 configured to receive an output from the system 100 or any of its components. Examples of the output devices 150 may include a display, audio speakers, a printing device, or another processor on printed circuit board, and so forth. In some cases, the output devices 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads (e.g., physical interfaces) at external memory controller 105 and one or more pins or pads (e.g., physical interfaces) at the memory device 110. In some examples, a pin may be an example of and broadly refer to any conductive input or output point of a device of the system 100, and a pin may be configured to act as part of a channel (e.g., according to a mapping between a physical pin or other physical interface and an information position or logical pin associated with the channel).

In some cases, a pin or pad of a terminal or bus may be part of a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170), including a routing by way of a physical routing or mapping, a logical routing of mapping, or a combination thereof.

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (e.g., including sixteen signal paths), and so forth. Signals communicated over the channels may use a double data rate (DDR) timing scheme. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data channels 190 (e.g., DQ channels). The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information per symbol. Multi-symbol modulation schemes and symbols may alternatively be referred to as non-binary, multi-bit, or higher-order modulation schemes and symbols.

In the system 100, a channel 115, such as a data channel 190 (e.g., a DQ channel, a DQ strobe (DQS) channel), may be configured for communicating information between the memory device 110 and a host device (e.g., between the memory device 110 and the external memory controller 105). In some examples, a channel 115 may include or otherwise be associated with a plurality of signal paths at each of the memory device 110 and the host device, and the respective signal paths may be coupled via physical pins or other physical interfaces (e.g., conductive interfaces, communicative interfaces, connectors, solder pads, input/output buses) between the memory device 110 and the host device.

In some examples, a signal path may be associated with a particular information position of a channel 115, which may be referred to as a bit position, an information or bit index, a logical pin (e.g., a data pin, a DQ pin), or other terminology indicating a position or order for which signaling carried via one signal path of the respective channel 115 may be considered relative to signaling carried via another signal path of the respective channel 115. For example, one signal path of a channel 115 may be configured for carrying a more-significant bit or a less significant bit than another signal path of the channel 115.

In some memory systems, such as DDR3 and DDR4 systems, data channel pin swapping (e.g., DQ pin swapping), such as a swapping of physical pins or logical pins, may be adopted in a hardware design to improve layout quality (e.g., circuit layout quality, PCB layout quality). However, in some examples, certain outputs, such as mode register read (MRR) outputs, may be fixed (e.g., fixing a particular information position or logical pin of a channel to a particular physical interface between components). Thus, data channel pin swapping without a configured remapping (e.g., a mapping of a silicon-on-chip (SoC) DDR controller for DQ pin connections) may lead to improper mode register read signaling, for example.

To support communication of information between the memory device 110 and a host device (e.g., with or via an external memory controller 105), the memory device 110 and the host device may each need to be configured with or according to a common definition of which portions of information carried by a channel 115 are carried on a particular physical signal path of the channel 115. However, for a given channel 115, a particular pin mapping or a particular assignment of information positions to physical pins or interfaces may be unfavorable in some designs of a host device or memory device 110. For example, in some designs, certain pin assignments or layouts may be more or less susceptible to cross-talk interference (e.g., higher or lower signal integrity), or may have relatively favorable or unfavorable physical layouts (e.g., more or fewer layout layers, favorable or unfavorable soldering characteristics), or may have relatively favorable or unfavorable signal path characteristics (e.g., longer or shorter signal paths, matched or mismatched signal path lengths, matched or mismatched signal path impedances), or may have other design, manufacturing, complexity, or operational advantages or disadvantages. Thus, a static pin mapping or a static assignment of information positions to particular physical interfaces may be unfavorable.

In accordance with examples as disclosed herein, the system 100 may be configured to convey signaling that supports dynamic channel mapping, such as a dynamic mapping between physical or logical pins of a host device and physical or logical pins of a memory device 110, or a dynamic mapping or assignment of pins of a memory device 110 or host device to different information positions (e.g., logical positions, information indices, sequential ordering) of a channel 115. In one example, the memory device 110 may include a first set of pins that are associated with a data channel 190 (e.g., a DQ channel), and a host device coupled with the memory device 110 may include a second set of pins that are associated with the data channel. The host device may include a controller (e.g., an external memory controller 105, a separate controller between the external memory controller 105 and the memory device 110) or other circuitry configured to receive signaling from the memory device 110 (e.g., from a device memory controller 155, from a local memory controller 165) for a channel mapping operation over one or more of the second set of pins, and determine, based at least in part on the received signaling, a mapping between a pin of the second set of pins and a respective one of the first set of pins. In some examples, the memory device 110 may transmit the signaling of the channel mapping operation to the host device based at least in part on a plurality of mode register values, which in various examples may be read by the memory device 110 (e.g., based on an initialization of the memory device 110), written to the memory device 110 by the host device, configured or preconfigured at the memory device 110, or various combinations thereof.

The system 100 may thus be configured to communicate information (e.g., information of a read command from a memory device 110 to a host device, information of a write command from a host device to a memory device 110) via the data channel based at least in part on the determined mapping (e.g., a dynamic mapping, based on the particular coupling between the memory device 110 and the host device). Accordingly, the system 100 may be configured to support communications with memory devices 110 that may be configured with different channel mapping (e.g., different mapping between information positions of a channel 115 and physical interfaces of the channel 115), which may improve the performance or flexibility of the system 100. In some examples, the described techniques may support different designs of a memory device 110 with a same technique that may be performed at a host device, which may, for example, support a SoC vendor implementing the described techniques to detect DQ pin swapping information and perform DQ pin connection mapping. In other words, in some examples of the described techniques, an SoC controller (e.g., of a host device) may be configured to detect a DQ pin swapping condition, and modify a communications configuration accordingly.

Figure 2:
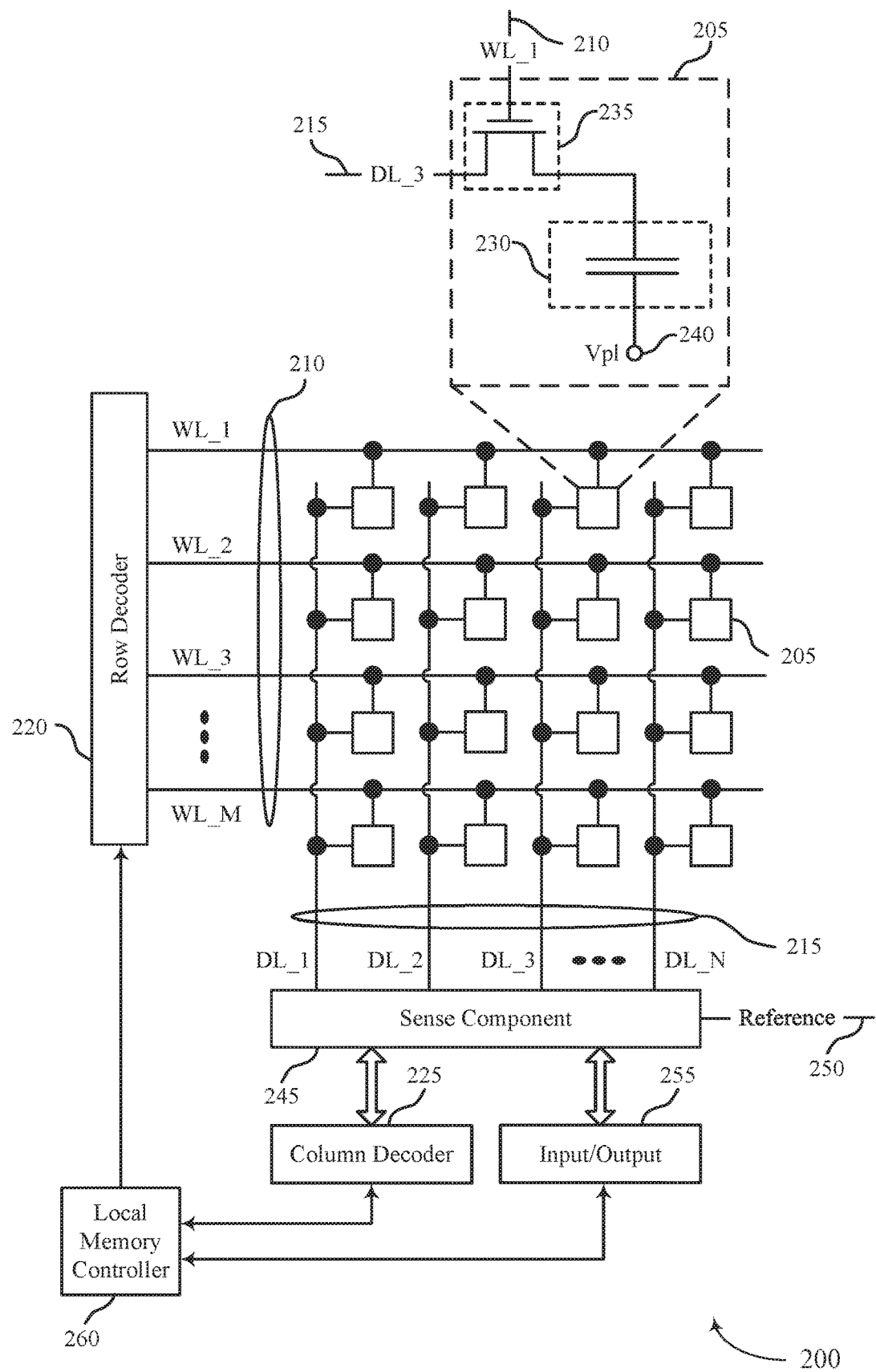
FIG. 2 illustrates an example of a memory die that supports dynamic channel mapping for a memory system in accordance with examples as disclosed herein.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of information at a time (e.g., a logic 0 or a logic 1). In some cases, a single memory cell 205 (e.g., a multi-level memory cell) may be configured to store more than one bit of information at a time (e.g., a logic 00, logic 01, logic 10, or a logic 11).

In some cases, a memory cell 205 may store a charge representative of the programmable states in a capacitor (e.g., a capacitor 230). In DRAM architectures, the memory cell 205 may include a capacitor that includes a dielectric material to store a charge representative of the programmable state. In FeRAM architectures, the memory cell 205 may include a capacitor that includes a ferroelectric material to store a charge and/or a polarization representative of the programmable state. In some examples (not shown), a memory cell 205 may include or otherwise be associated with a configurable material, which may be referred to as a memory element, a memory storage element, a material element, a material memory element, a material portion, a polarity-written material portion, and others. A configurable material may have one or more variable and configurable characteristics or properties (e.g., material states) that are representative of (e.g., correspond to) different logic states.

For example, a configurable material may take different forms, different atomic configurations, different degrees of crystallinity, different atomic distributions, or otherwise maintain different characteristics. In some examples, such characteristics may be associated with different electrical resistances, different threshold voltages, or other properties that are detectable or distinguishable during a read operation to identify a logic state stored by the configurable material. In other memory architectures, other storage devices and components may be used to support the techniques described herein. For example, in some other memory architectures, the memory cell 205 may store a charge representative of the programmable states in a transistor (e.g., in a floating gate of a transistor).

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 or other storage element (e.g., a configurable material memory element), and in some examples may also include a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

In the illustrated example, referring to a capacitive memory architecture, selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of the memory cell 205 may be provided as an output of the sense component 245 (e.g., to an input/output 255), and may indicate the detected logic state to another component of a memory device 110 that includes the memory die 200, such as a device memory controller 155 (e.g., directly or using the local memory controller 260).

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

In some examples, the memory die 200 (e.g., the local memory controller 260, the input/output component 255) may be configured to communicate with a host device over a channel 115, such as a data channel 190 (e.g., a DQ channel). In some examples, the channel 115 may be associated with a plurality of pins (e.g., physical pins) or signal paths of the memory die 200, and the pins or signal paths may each be associated with a respective information position or logical pin of the channel 115. To support communication of information between the memory die 200 and a host device, the memory die 200 may need to be configured with or according to a definition of which portions of information of a channel 115 are carried on a particular signal path or physical interface (e.g., physical pin) of the memory die 200. However, for a given channel 115, a particular pin or signal path mapping or assignment of information positions to pins or signal paths may be unfavorable in some designs of the memory die 200 or of a system that includes the memory die 200. Thus, a particular signal path mapping or assignment of information positions to particular pins or signal paths may be unfavorable in some designs.

In accordance with examples as disclosed herein, the memory die 200 may be configured to transmit or otherwise support signaling that supports dynamic channel mapping (e.g., by a host device), such as a dynamic mapping between pins of a host device and pins of a memory device 110 that includes the memory die 200, or a dynamic mapping or assignment of physical pins of a memory device 110 or host device to different information positions (e.g., logical positions, information indices, logic pins, sequential ordering) of a channel 115. For example, the memory die 200 may be configured to read a plurality of mode register values configured for a channel mapping operation (e.g., based on an initialization of the memory die 200), and transmit signaling of the channel mapping operation to a host device (e.g., via a device memory controller 155 of a memory device 110 that includes the memory die 200) based at least in part on the plurality of mode register values.

The memory die 200 may thus be configured to communicate information (e.g., information of a read command from the memory die 200 to a host device, information of a write command from a host device to the memory die) according to various pin mapping configurations, which may be detected by the host device based at least in part on the transmitted signaling of the channel mapping operation. Accordingly, the memory die 200 may be designed or configured according to various channel mappings (e.g., mapping between information positions or logical pins of a channel 115 and physical signal paths, interfaces, or physical pins of the channel 115), which may improve the performance or flexibility of the memory die 200.

Figure 3:
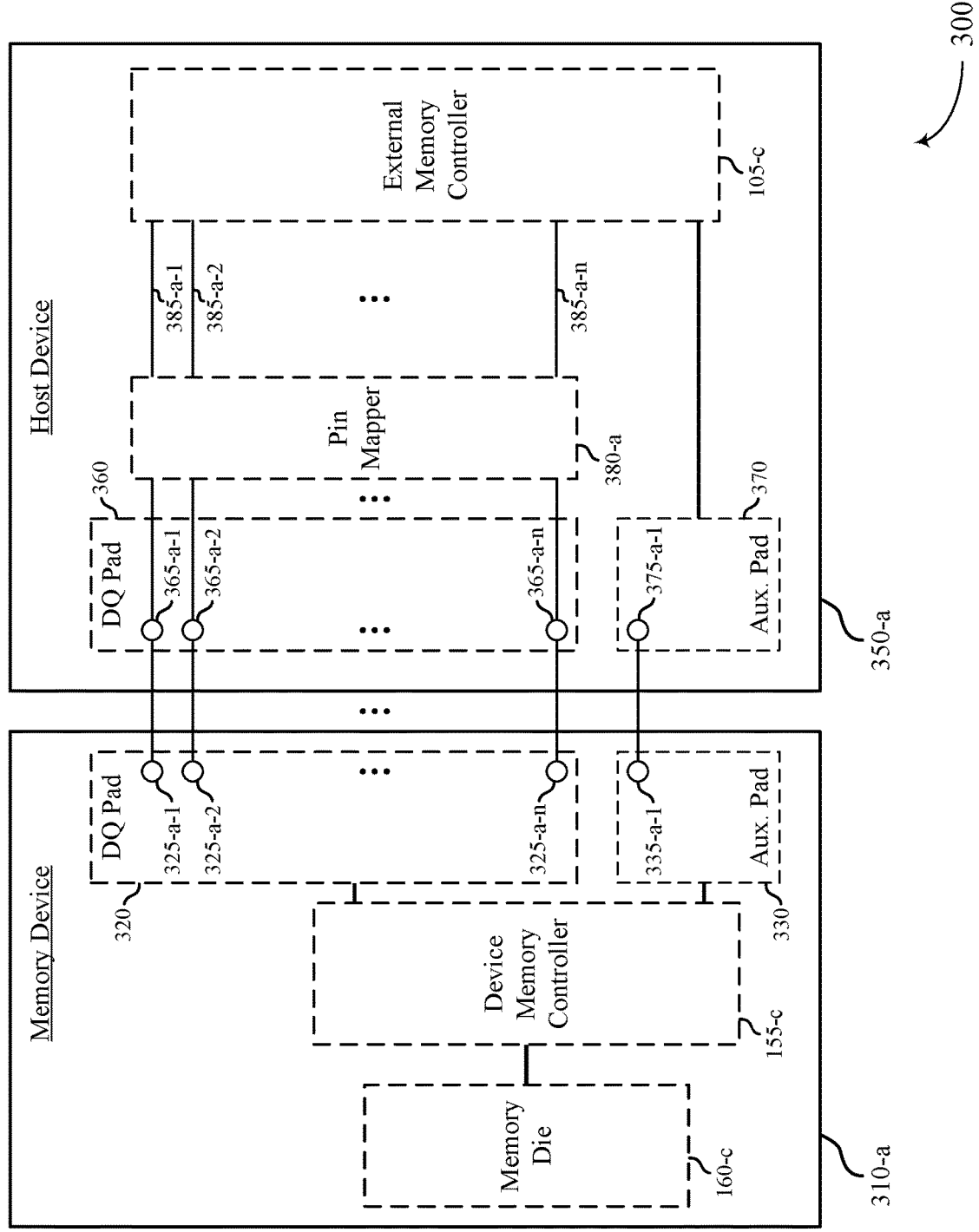
FIG. 3 illustrates an example of a system that supports dynamic channel mapping for a memory system in accordance with examples as disclosed herein.

FIG. 3 illustrates an example of a system 300 that supports dynamic channel mapping for a memory system in accordance with examples as disclosed herein. The system includes a memory device 310-a and a host device 350-a coupled with the memory device 310-a (e.g., configured for communication with the memory device 310-a). The memory device 310-a may be an example of the memory device 110 described with reference to FIG. 1, and the host device 350-a may be an example of a host device described with reference to FIG. 1 (e.g., a device that uses the memory device 310-a to store information). Although the host device 350-a is shown as being coupled with a single memory device 310, a host device 350 in accordance with the described techniques may be configured for being coupled (e.g., simultaneously) with one or more memory devices 310. For example, the system 300 may illustrate aspects of an automotive system, such as a media platform or autonomous driving platform, which may have four, eight, or any other number of memory devices 310. In various examples, the system 300 may illustrate aspects of a package-on-package (PoP) design, a printed circuit board (PCB) system or configuration, or other designs.

The memory device 310-a may include one or more memory dice (e.g., a memory die 160-c) and one or more device memory controllers (e.g., device memory controller 155-c), which may be examples of corresponding components described with reference to FIG. 2. The memory device 310-a may also include one or more physical pins or interfaces for conveying signaling between the memory device 310-a and the host device 350-a. For example, the memory device 310-a may include a plurality of memory pins 325-a (e.g., memory pins 325-a-1 through 325-a-n), which may refer to physical interfaces or signal paths of a channel (e.g., a data channel, a DQ channel). The memory device 310-a may also include one or more memory pins 335-a (e.g., memory pin 335-a-1), which may refer to one or more physical interfaces or signal paths of one or more other channels that are different from a channel associated with the memory pins 325-a (e.g., a control channel, a CA channel, a clock channel, an error correction channel, a channel that supports initialization signaling, a channel that supports read, write, configuration, or other commands, a power supply channel or other interface, or various combinations thereof).

The physical interfaces of the memory pins 325-a or the memory pins 335-a may include one or more of a mechanical interface, a conductive interface, a magnetic interface, an electromagnetic interface, a capacitive interface, an inductive interface, an optical interface, or others. In some examples, the memory pins 325-a or the memory pins 335-a may be physically arranged in an I/O pad (e.g., a DQ pad 320 corresponding to the memory pins 325-a, an auxiliary pad corresponding to the memory pins 335-*a*), which may refer to a physical grouping or configuration of the memory pins 325-*a* or memory pins 335-*a* that supports coupling (e.g., mechanical coupling, communicative coupling) with the host device 350-*a*. In various examples, such coupling between the memory device 310-*a* and the host device 350-*a* may be provided by way of soldering, brazing, pin and socket connectors, fasteners, or other types of physical or communicative coupling. Although the DQ pad 320, for example, is shown with a generally linear arrangement of memory pins 325-*a*, such an example is provided for illustrative purposes, and a DQ pad 320 or auxiliary pad 330 in accordance with the described techniques may include various other arrangements of memory pins 325-*a* or 335-*a* in one dimension, two dimensions, or three dimensions.

In the example of system 300, the memory device 310-*a* may be configured with a channel mapping associated with the memory pins 325-*a*. For example, a first information position (e.g., logical pin, data pin) of the channel may be mapped to the memory pin 325-*a*-1, a second information position of the channel may be mapped to the memory pin 325-*a*-2, and so on. In various examples, the channel mapping of the memory device 310-*a* may be a static mapping or a dynamic mapping. For example, the channel mapping of the memory device 310-*a* may be a fixed mapping (e.g., a preconfigured mapping, a designed mapping, a manufactured mapping, a physical mapping) between logical pins or information positions of the channel and the memory pins 325-*a*, where such a mapping may be determined based on various design constraints or considerations for the memory device 310-*a*, the host device 350-*a*, or the system 300 as a whole. In some examples, the channel mapping of the memory device 310-*a* may be configurable (e.g., selected from a set of channel mappings), which may include various examples of dynamic mapping (e.g., based on an operating mode, based on a command or instruction from the host device 350-*a*).

The host device 350-*a* may include an external memory controller 105-*c*, which may be an example of an external memory controller 105 described with reference to FIG. 1. The host device 350-*a* may also include one or more physical pins or interfaces for conveying signaling between the host device 350-*a* and one or more other memory devices 310, such as the memory device 310-*a*. For example, the host device 350-*a* may include a plurality of host pins 365-*a* (e.g., host pins 365-*a*-1 through 365-*a*-*n*), which may refer to physical interfaces or signal paths of a channel (e.g., a data channel, a DQ channel). The host device 350-*a* may also include one or more host pins 375-*a* (e.g., host pin 375-*a*-1), which may refer to one or more physical interfaces or signal paths of one or more other channels that are different from a channel associated with the host pins 365-*a* (e.g., a control channel, a CA channel, a clock channel, an error correction channel, a channel that supports initialization signaling, a channel that supports read, write, configuration, or other commands, a power supply channel or other interface, or various combinations thereof).

The physical interfaces of the host pins 365-*a* or the host pins 375-*a* may include one or more of a mechanical interface, a conductive interface, a magnetic interface, an electromagnetic interface, a capacitive interface, an inductive interface, an optical interface, or others. In some examples, the host pins 365-*a* or the host pins 375-*a* may be physically arranged in an I/O pad (e.g., a DQ pad 360 corresponding to the host pins 365-*a*, an auxiliary pad 370 corresponding to the host pins 375-*a*), which may refer to a physical grouping or configuration of the host pins 365-*a* or host pins 375-*a* that supports coupling (e.g., mechanical coupling, communicative coupling) with the memory device 310-*a*. In some examples, the DQ pad 360 and the auxiliary pad 370 of the host device 350-*a* may share one or more dimensions with the DQ pad 320 or the auxiliary pad 330 of the memory device 310-*a* (e.g., a same layout of pins, a reflected layout of pins), which may support various examples of mechanical or communicative coupling between the host device 350-*a* and the memory device 310-*a*. Although the DQ pad 360, for example, is shown with a generally linear arrangement of host pins 365-*a*, such an example is provided for illustrative purposes, and a DQ pad 360 or auxiliary pad 370 in accordance with the described techniques may include various other arrangements of host pins 365-*a* or 375-*a* in one dimension, two dimensions, or three dimensions.

In the example of system 300, the host device 350-*a* may also include a pin mapper 380-*a*, which may support dynamic mapping between the host pins 365-*a* and a set of data pins 385-*a* (e.g., data channel pins. DQ pins, information positions, logical pins), where the data pins 385-*a* may also be associated with the data channel. In various examples, the data pins 385-*a* may refer to physical or logical constructs of the host device 350-*a* that are arranged in a particular order for supporting communications over the data channel. For example, the data pins 385-*a* may correspond to information positions that may be ascribed to data received via the host pins 365, or information positions that may be ascribed to data to be transmitted via the host pins 365, or both. In some examples, the data pins 385 may be arranged in an increasing or decreasing order of significance (e.g., from a least-significant bit to a most-significant bit of the data channel, from a most-significant bit to a least-significant bit of the data channel). The data pins 385-*a* may accordingly be configured to be coupled with the external memory controller 105-*c*, for example, in a known order or sequence of information positions.

The pin mapper 380-*a* may be configured to support various examples of channel mapping or pin mapping related to the memory pins 325-*a* and the host pins 365-*a*, which may include mapping respective ones of the memory pins 325-*a* or host pins 365-*a* to data pins 385-*a*. In some examples, the pin mapper 380-*a* may refer to a configurable switching network (e.g., a transistor network, a multiplexer) that routes, couples, or connects a physical signal path associated with one of the host pins 365-*a* with a physical signal path associated with one of the data pins 385-*a*. In some examples, the pin mapper 380-*a* may refer to a configurable logical transposer, logical multiplexer, or other logical component that reorders how signaling associated with one of the host pins 365-*a* is configured or interpreted relative to signaling associated with another of the host pins 365-*a* (e.g., a logical routing or mapping).

Although the host device 350-*a* is illustrated as including one pin mapper 380-*a*, a host device 350 in accordance with the described techniques may include more than one pin mapper 380. For example, a host device 350 may include a respective pin mapper 380 for each of a plurality of DQ pads 360, a respective pin mapper 380 for each of a plurality of memory devices 310 coupled with the host device 350-*a*, a respective pin mapper 380 for each of a plurality of channels between the host device 350-*a* and a memory device 310, and other configurations, where respective pin mappers 380 may or may not share a mapping configuration. Moreover, although the pin mapper 380-*a* is illustrated as being separate from the external memory controller 105-*c*, in various examples a pin mapper 380 may or may not be included in (e.g., within the illustrative boundary) of an external memory controller 105 or a DQ pad 360.

The pin mapper 380-*a* may be configured to receive signaling from the memory device 310-*a* for a channel mapping operation (e.g., signaling over one or more of the host pins 365-*a*, which may be transmitted over one or more of the memory pins 325-*a*), and determine a mapping between pins of the system 300 based at least in part on the received signaling. In one example or interpretation, the pin mapper 380-*a* may be configured to map respective ones of the host pins 365-*a* with a respective one of the data pins 385-*a* (e.g., determining which one of the host pins 365-*a*, and accordingly which one of the memory pins 325, conveys signaling associated with a particular information position of a respective one of the data pins 385-*a*). In another example or interpretation, the pin mapper 380-*a* may be configured to map respective ones of the host pins 365-*a* with respective pins (e.g., data pins, logical pins, information positions, DQ pins) of the memory device 310-*a* that correspond to the memory pins 325-*a*. Various other examples or interpretations for dynamic pin mapping or channel mapping by the pin mapper 380-*a* are possible, and such techniques may be applied to channels such as data channels (e.g., one or more DQ channels), or other channels configured for communication between the host device 350-*a* and the memory device 310-*a*.

In accordance with the described techniques, the pin mapper 380-*a* may be an example of a controller or circuitry configured for dissociating physical pins or signal paths from logical pins in the system 300, and supporting a dynamic configuration or reconfiguration between physical pins or interfaces and logical pins or information positions (e.g., dynamic configurations of the host pins 365 and the data pins 385). Thus, the host device 350-*a* may be able to support different configurations of memory devices 310, such as different memory devices 310 that associate different information positions to respective ones of the memory pins 325. To support such dynamic mapping, memory devices 310 may be configured to transmit signaling for a channel mapping operation that supports a pin mapper 380 determining which of the data pins 385 correspond to a given host pin 365 or memory pin 325, including the various examples of signaling described herein.

Figure 4A:
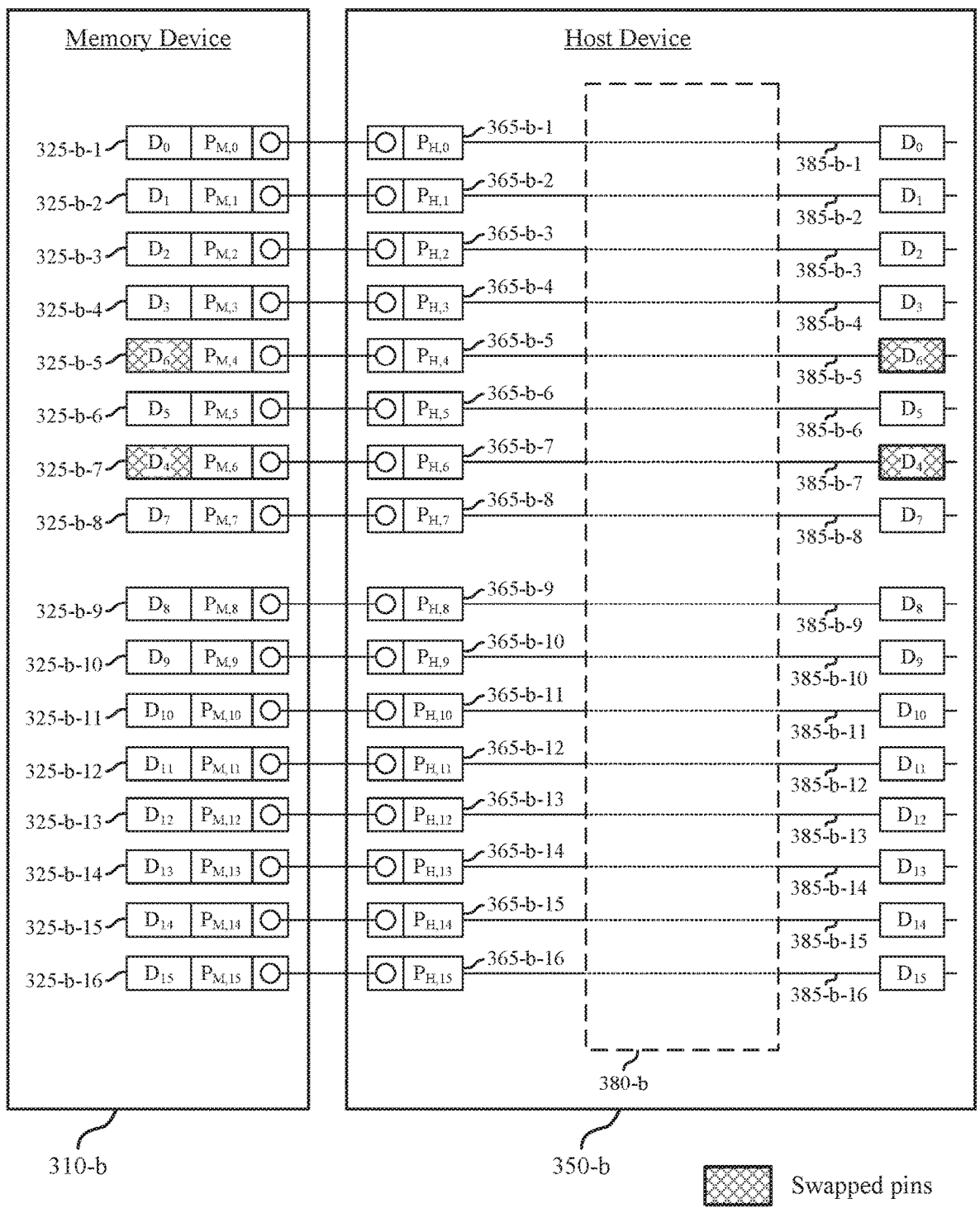
FIGS. 4A through 4C illustrate an example of a system that supports dynamic channel mapping for a memory system in accordance with examples as disclosed herein.
Figure 4B:
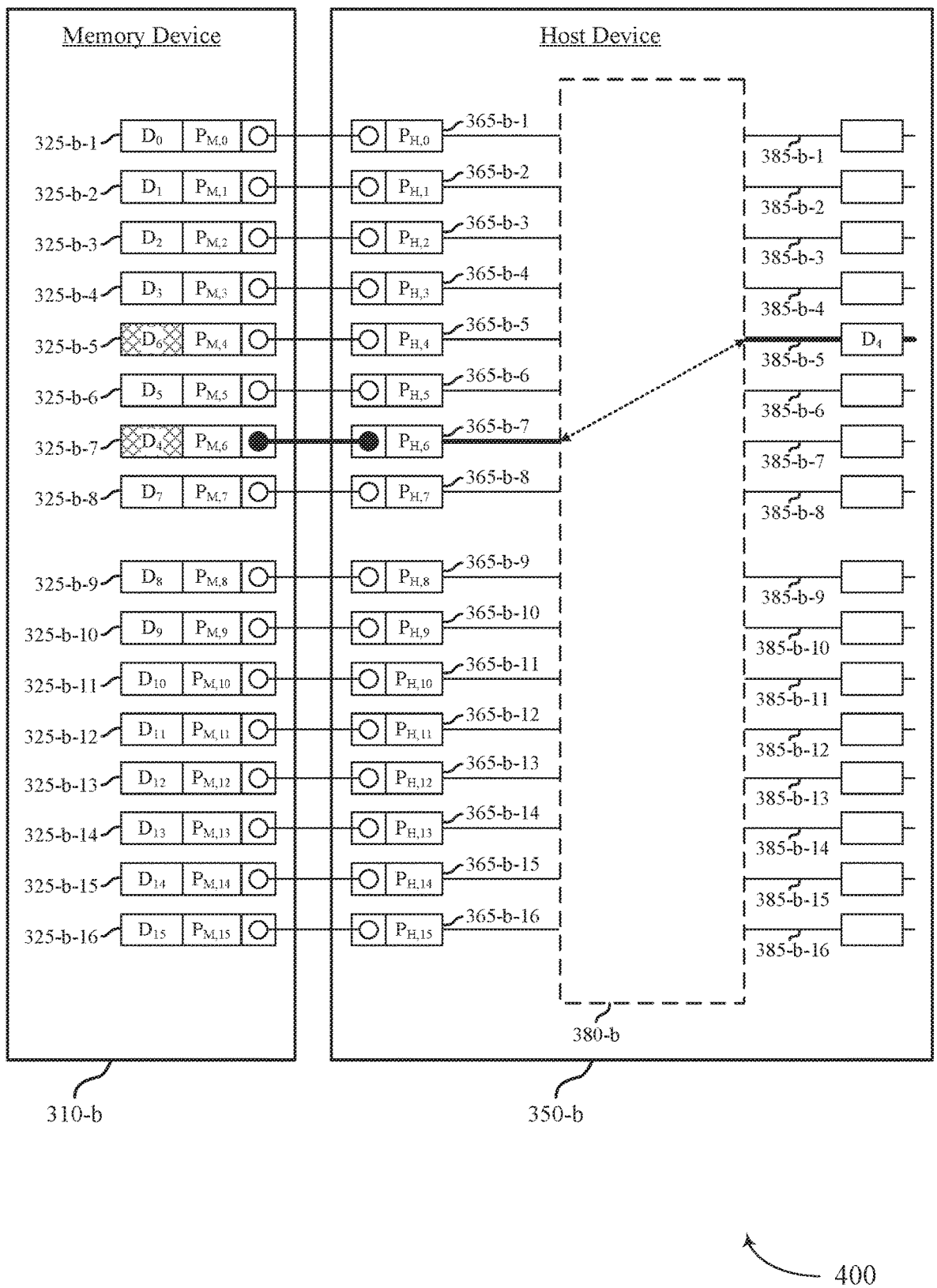
Figure 4C:
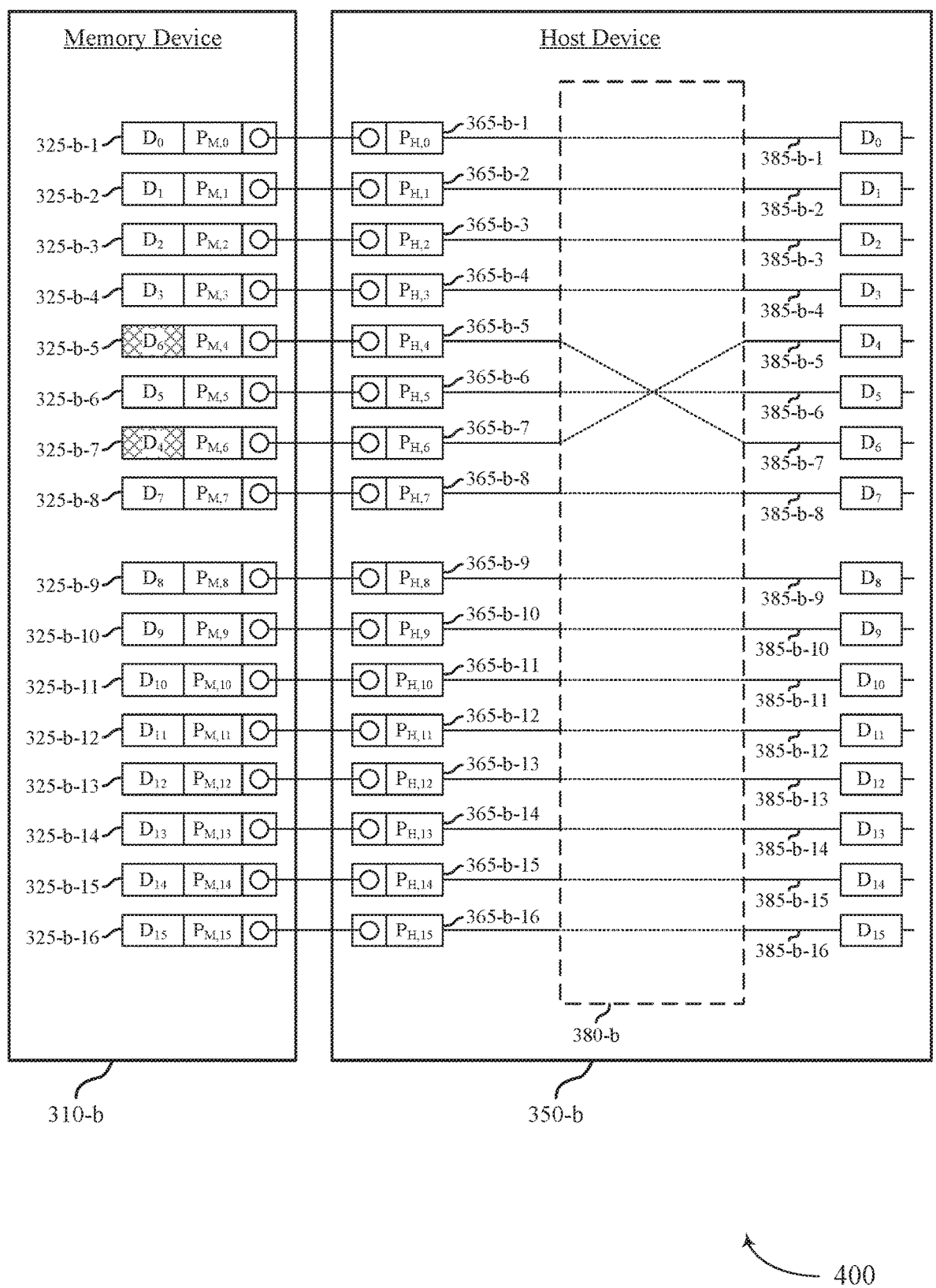

FIGS. 4A through 4C illustrate an example of a system 400 that supports dynamic channel mapping for a memory system in accordance with examples as disclosed herein. The system 400 includes a memory device 310-*b* and a host device 350-*b*, and may illustrate an example of bit-level mapping in accordance with the described techniques.

The system 400 may be configured with a channel (e.g., a data channel, a DQ channel) having sixteen information positions (e.g., data pins, DQ pins, logical pins, bit positions, bit numbers), which may be referred to as information positions $D_0$ through $D_{15}$. In some examples, each of the information positions may refer to a particular bit of the channel, and the information positions may be referred to as bit positions. For example, $D_0$ may refer to a most-significant bit and $D_{15}$ may refer to a least-significant bit, or $D_0$ may refer to a least-significant bit and $D_{15}$, may refer to a most-significant bit. In other examples, one or more of the information positions may refer to or otherwise correspond to more than a single bit of information, which may be supported by multi-level memory cells 205, multi-level modulation schemes, or other techniques.

The memory device 310-*b* may be configured with sixteen memory pins 325-*b* (e.g., memory pins 325-*b*-1 through 325-*b*-16, physical pins, signal paths, or interfaces), which may be referred to as $P_{M,0}$ through $P_{M,15}$. In the example of system 400, each of the information positions may be mapped to a respective one of the memory pins 325-*b* at the memory device 310-*b* according to a static mapping as shown (e.g., a mapping of information position $D_0$ with $P_{M,0}$ corresponding to memory pin 325-*b*-1). In other examples, each of the information positions may be mapped to a respective one of the memory pins 325-*b* at a memory device 310 according to a dynamic mapping (e.g., by a pin mapper of the memory device 310, not shown).

The host device 350-*b* may be configured with sixteen host pins 365-*b* (e.g., host pins 365-*b*-1 through 365-*b*-16, physical pins, signal paths, or interfaces), which may be referred to as $P_{H,0}$ through $P_{H,15}$. The host pins 365-*b* and the memory pins 325-*b* may be configured for a 1:1 mapping (e.g., a mapping between $P_{M,0}$ and $P_{H,0}$, between $P_{M,1}$ and $P_{H,1}$, and so on), which may include a physical mapping or connection (e.g., wiring, soldering, brazing, or other 1:1 coupling). The host device 350-*b* may also be configured with sixteen data pins 385-*b* (e.g., data pins 385-*b*-1 through 385-*b*-16) which may refer to physical signal paths or a logical construct used to order or sequence signaling conveyed via the host pins 365-*b*. Each of the data pins 385-*b* may be associated with one of the information positions $D_0$ through $D_{15}$, and each of the data pins 385-*b* or information positions $D_0$ through $D_{15}$ may be mapped with a respective host pin 365-*b* using the pin mapper 380-*b*.

In some examples, the host device 350-*b* may be configured for communications via the data pins 385-*b* (e.g., communications of the channel, which may be passed to or from other components of the host device 350-*b*) according to a sequential order of information positions, such as an ordering, from top to bottom, of a most-significant bit to a least-significant bit, or least-significant bit to most-significant bit. For example, the host device 350-*b* may be configured to communicate the first information position, $D_0$, via the data pin 385-*b*-1, communicate the second information position, Di, via the data pin 385-*b*-2, and so on. In some examples, communications with a memory device 310 according to this configuration may be supported by a default or initial mapping between data pins 385-*b* and the host pins 365-*b* (e.g., a default or initial mapping between data pins 385-*b* and the memory pins 325-*b*, a first mapping used by the host device 350-*b* prior to performing channel mapping operations), such as the dotted line mapping of the pin mapper 380-*b* shown in FIG. 4A. However, in various examples, memory devices 310 may be configured with a different channel mapping that may be incompatible with such a default or initial mapping.

In the example of system 400, the memory device 310-*b* may be configured with a mapping between information position $D_4$ and memory pin $P_{M,6}$ corresponding to the memory pin 325-*b*-7, and a mapping between the information position $D_6$ and memory pin $P_{M,4}$ corresponding to the memory pin 325-*b*-5, which may be different from a sequential ordering. Though illustrated as a reordering of $D_6$ and $D_4$ at the memory device 310-*b*, it is to be understood that this is only one example configuration and conceptualization— in some cases, this may equivalently represent a coupling of $P_{M,6}$ at the memory device 310-*b* with $P_{H,4}$ at the host device 350-*b* and a coupling of $P_{M,4}$ at the memory device 310-*b* with $P_{H,6}$ at the host device 350-*b* (e.g., due to PCB layout considerations). Regardless of the conceptualization or physical implementation, from the perspective of the host device 350-*b*, the information positions from top to bottom (e.g., at the data pins 385-*b*) may not be arranged in a sequential order when the pin mapper 380-*b* is configured according to the default or initial mapping of FIG. 4A. Rather, as shown, information positions $D_4$ and $D_6$ may be swapped, which may be referred to as swapped pins, swapped information positions, swapped bits, swapped lines, or other descriptions. Such a swap of information positions (e.g., at the data pins 385-*b*) may, in some examples of the system 400, result in improper operation of the system 400 absent the channel mapping operations described herein.

In accordance with examples of the present disclosure, the system 400 may be configured to perform a dynamic channel mapping for the channel corresponding to information positions $D_0$ through $D_{15}$. For example, the memory device 310-*b* may convey signaling to the host device 350-*b* (e.g., via one or more of the memory pins 325-*b*, via one or more of the host pins 365-*b*) for a channel mapping operation, and the host device (e.g., the pin mapper 380-*b*) may determine a channel mapping based at least in part on receiving the signaling. Thus, the host device 350-*b* may be able to support different mappings between information positions and memory pins 325-*b* or host pins 365-*b*, which may improve performance or flexibility of the system 400 (e.g., improved flexibility to optimize the physical routing of signals between the memory device 310-*b* and the host device 350-*b* or other aspects of the system). In some examples, the described techniques may be described as enabling the host device 350-*b* to detect a DQ pin swapping condition of the memory device 310-*b*.

In one example, the memory device 310-*b* may transmit signaling according to a logic state via one of the memory pins 325-*b*, or otherwise activate or enable one of the memory pins 325-*b*, where such a signaling or activation may correspond to an information position known at the host device 350-*b* (e.g., based on a preconfiguration known to both the memory device 310-*b* and the host device 350-*b*, based on a command transmitted from the host device 350-*b* to the memory device 310-*b*). For example, as shown in FIG. 4B, to indicate a memory pin 325-*b* or host pin 365-*b* corresponding to the information position $D_4$, the memory device 310-*b* may activate or transmit signaling of a logic state for the information position $D_4$ via the memory pin 325-*b*-7, which is coupled with the host pin 365-*b*-7. Although the default or initial mapping of FIG. 4A would have mapped the host pin 365-*b*-7 with the data pin 385-*b*-7, the host device 350-*b* may be configured to interpret the signaling of FIG. 4B as corresponding to the information position $D_4$, which should correspond to the data pin 385-*b*-5. Thus, as shown in FIG. 4B, the host device 350-*b* (e.g., the pin mapper 380-*b*) may determine a mapping between the host pin 365-*b*-7 and the data pin 385-*b*-5, shown by the dotted line within the pin mapper 380-*b*, based at least in part on the signaling received via the memory pin 325-*b*-7 and the host pin 365-*b*-7.

The system 400 may repeat similar signaling between the memory device 310-*b* and the host device 350-*b* (e.g., at different times for different memory pins 325-*b* or host pins 365-*b*, or different groups thereof) for other information positions to determine a 1:1 mapping for each of the data pins 385-*b* with a respective one of the host pins 365-*b* or memory pins 325-*b*. Thus, the host device 350-*b* (e.g., the pin mapper 380-*b*) may determine the mapping at the pin mapper 380-*b* illustrated in FIG. 4C (e.g., based on a sequence of signaling), where such a mapping may be referred to as or otherwise include a mapping of the information position $D_4$ or the data pin 385-*b*-5 with the host pin 365-*b*-7 or memory pin 325-*b*-7 and mapping the information position $D_6$ or the data pin 385-*b*-7 with the host pin 365-*b*-5 or memory pin 325-*b*-5. In some examples, such a mapping may be interpreted as swapping data pin 385-*b*-5 with data pin 385-*b*-7, swapping host pin 365-*b*-5 with host pin 365-*b*-7, swapping memory pin 325-*b*-5 with memory pin 325-*b*-7, or other physical or logical implementations, interpretations, or phrasings.

In some examples, signaling to support the described techniques for dynamic channel mapping may be based at least in part on mode register values at the memory device 310-*b*, which may be preconfigured at the memory device 310-*b* (e.g., as part of manufacturing process, as part of a fuseload process, as trim parameters), or commanded by the host device 350-*b* (e.g., using mode register write commands). For example. Table 1 illustrates an example of bit sequences that may be signaled by a memory device 310 and received at a host device 350 to resolve a mapping between information positions (e.g., DQ pins) DQ0 through DQ15 of a DQ channel, which may be an example of information positions $D_0$ through $D_{15}$ of FIGS. 4A through 4C. In the example of Table 1, information positions may be divided at a byte level, where information positions DQ0 through DQ7 may correspond to a first byte (e.g., a lower byte) and information positions DQ8 through DQ15 may correspond to a second byte (e.g., an upper byte). Each of the bits of the respective bit sequence may refer to a unit interval of a data burst, or an instance of a data strobe, such that the indicated signaling may be an example of holding a same value or signaling bias for 16 unit intervals.

TABLE 1

| | | | Bit sequences to support bit-level channel mapping | | | | | | | | | | | | | | | |
|---|---|---|---|---|---|---|---|---|---|---|---|---|---|---|---|---|---|---|
| | | | Bit Sequence | | | | | | | | | | | | | | | |
| | | | MR40 | | | | | | | | MR32 | | | | | | | |
| | Pin | Invert | 15 | 14 | 13 | 12 | 11 | 10 | 9 | 8 | 7 | 6 | 5 | 4 | 3 | 2 | 1 | 0 |
| MR15 | DQ0 | Yes | 0 | 0 | 0 | 0 | 0 | 0 | 0 | 0 | 0 | 0 | 0 | 0 | 0 | 0 | 0 | 0 |
| | DQ1 | No | 1 | 1 | 1 | 1 | 1 | 1 | 1 | 1 | 1 | 1 | 1 | 1 | 1 | 1 | 1 | 1 |
| | DQ2 | No | 1 | 1 | 1 | 1 | 1 | 1 | 1 | 1 | 1 | 1 | 1 | 1 | 1 | 1 | 1 | 1 |
| | DQ3 | No | 1 | 1 | 1 | 1 | 1 | 1 | 1 | 1 | 1 | 1 | 1 | 1 | 1 | 1 | 1 | 1 |
| | DMI0 | Never | 1 | 1 | 1 | 1 | 1 | 1 | 1 | 1 | 1 | 1 | 1 | 1 | 1 | 1 | 1 | 1 |
| | DQ4 | No | 1 | 1 | 1 | 1 | 1 | 1 | 1 | 1 | 1 | 1 | 1 | 1 | 1 | 1 | 1 | 1 |
| | DQ5 | No | 1 | 1 | 1 | 1 | 1 | 1 | 1 | 1 | 1 | 1 | 1 | 1 | 1 | 1 | 1 | 1 |
| | DQ6 | No | 1 | 1 | 1 | 1 | 1 | 1 | 1 | 1 | 1 | 1 | 1 | 1 | 1 | 1 | 1 | 1 |
| | DQ7 | No | 1 | 1 | 1 | 1 | 1 | 1 | 1 | 1 | 1 | 1 | 1 | 1 | 1 | 1 | 1 | 1 |
| MR20 | DQ8 | Yes | 0 | 0 | 0 | 0 | 0 | 0 | 0 | 0 | 0 | 0 | 0 | 0 | 0 | 0 | 0 | 0 |
| | DQ9 | No | 1 | 1 | 1 | 1 | 1 | 1 | 1 | 1 | 1 | 1 | 1 | 1 | 1 | 1 | 1 | 1 |

TABLE 1-continued

Bit sequences to support bit-level channel mapping

| | | Bit Sequence | | | | | | | | | | | | | | | |
|---|---|---|---|---|---|---|---|---|---|---|---|---|---|---|---|---|---|
| | | MR40 | | | | | | | | MR32 | | | | | | | |
| Pin | Invert | 15 | 14 | 13 | 12 | 11 | 10 | 9 | 8 | 7 | 6 | 5 | 4 | 3 | 2 | 1 | 0 |
| DQ10 | No | 1 | 1 | 1 | 1 | 1 | 1 | 1 | 1 | 1 | 1 | 1 | 1 | 1 | 1 | 1 | 1 |
| DQ11 | No | 1 | 1 | 1 | 1 | 1 | 1 | 1 | 1 | 1 | 1 | 1 | 1 | 1 | 1 | 1 | 1 |
| DMI1 | Never | 1 | 1 | 1 | 1 | 1 | 1 | 1 | 1 | 1 | 1 | 1 | 1 | 1 | 1 | 1 | 1 |
| DQ12 | No | 1 | 1 | 1 | 1 | 1 | 1 | 1 | 1 | 1 | 1 | 1 | 1 | 1 | 1 | 1 | 1 |
| DQ13 | No | 1 | 1 | 1 | 1 | 1 | 1 | 1 | 1 | 1 | 1 | 1 | 1 | 1 | 1 | 1 | 1 |
| DQ14 | No | 1 | 1 | 1 | 1 | 1 | 1 | 1 | 1 | 1 | 1 | 1 | 1 | 1 | 1 | 1 | 1 |
| DQ15 | No | 1 | 1 | 1 | 1 | 1 | 1 | 1 | 1 | 1 | 1 | 1 | 1 | 1 | 1 | 1 | 1 |

In the example of Table 1, a bit sequence may be conveyed on respective signal paths (e.g., memory pins 325, host pins 365) for each of the respective information positions. A default sequence or default data for the bit sequences may be a string of sixteen ones (or other logic state), which may be controlled by mode registers MR40 and MR32 (e.g., according to a LPDDR4× configuration). For example, to support the channel mapping operation, each of the mode registers MR40 and MR32 may be set to hexadecimal values of 0xFF (e.g., 11111111), and each mode register may be associated with a burst or portion of a burst (e.g., MR32 corresponding to a "burst 0" and MR40 corresponding to a "burst 1"). In some examples, such values may be commanded or written by the host device 350, and may or may not be the same values used in other operations (e.g., for communicating information before or after the channel mapping operation).

Continuing with the example of Table 1, the signaling for a particular information position or signal path may be controlled by an inversion flag corresponding to the respective information position or signal path. Table 1, for example, may refer to a configuration for detecting information positions DQ0 and DQ8, where each of the information positions DQ0 and DQ8 may be set with an "invert" bit or flag. Thus, the signaling conveyed for information positions DQ0 and DQ8 may be inverted to a string of sixteen zeros, whereas the signaling conveyed for other information positions may not be inverted, and accordingly convey the default string of sixteen ones. Such an inversion setting may be controlled by mode registers MR15 and MR20. For example, to support the inversion of information position DQ0, mode register MR15 may be set to 0x01 (e.g., 00000001), and to support the inversion of information position DQ8, mode register MR20 may be set to 0x01 (e.g., 00000001). In other words, to support the described channel mapping, the information or signaling for a target data pin may be inverted by a particular value of mode registers MR15 and MR20.

In some examples, the host device 350 may be configured to map the information position DQ0 within a first byte (e.g., eight information positions, eight memory pins 325, eight host pins 365, eight data pins 385) and map the information position DQ8 within a second byte (e.g., mapping two pins simultaneously), which may improve channel mapping efficiency compared with mapping each information position individually. For example, according to some standards or configurations, individual pins may not be allowed to be swapped from one byte to another, or may not support being swapped in such a manner due to some other limitation (e.g., physical limitation). Thus, in some examples of the system 400, pin swapping may be limited to swapping of individual bits within a byte. In some examples (e.g., according to certain memory standards), pin swapping detection may be valid for certain channels or channel configurations (e.g., ×16 data channels according to a LPDDR4× standard).

In accordance with the described techniques, the host device 350 may identify which of a set of host pins 365 or memory pins 325 correspond to the information position DQ0 and DQ8 by identifying which of a set of host pins 365 or memory pins 325 are carrying signaling corresponding to sixteen zeros (e.g., in contrast with other host pins 365 or memory pins 325 conveying signaling corresponding to sixteen ones), and determine a mapping between the identified host pins 365 or memory pins 325 and a corresponding data pin 385. More generally, to support some examples of channel mapping, the host device 350 may be configured to identify which memory pins 325 or host pins 365 have been activated (e.g., according to an inversion setting, according to signaling or voltage of the respective pins).

Although the bit sequences of Table 1 are configured for mapping two information positions (e.g., DQ0 and DQ8), in another example, such signaling may be conveyed over a single signal path corresponding to a single information position. For example, returning to the signaling illustrated in FIG. 4B, in one portion of a channel mapping operation, the memory device 310-b may be configured to convey signaling of sixteen zeros, or some other signaling, activation, or enabling for the information position $D_4$ via the memory pin 325-b-7, which the host device may receive via the host pin 365-b-7. The host device 350-b may be configured to interpret such signaling as corresponding to the information position $D_4$ (e.g., compared to other information positions and host pins 365-b carrying signaling of sixteen ones, or some other signaling or deactivation), and accordingly map the host pin 365-b-7 or the memory pin 325-b-7 with the data pin 385-b-5. Such signaling may be performed for each information position (e.g., by changing which of the information positions convey signaling of sixteen zeros and which of the information positions convey signaling of sixteen ones) to complete the mapping operation.

Thus, a system that includes a memory device 310 and a host device 350 may be configured to convey a sequence of signaling for a channel mapping operation, and the host device 350 may determine a channel mapping based at least in part on receiving the signaling. The example of Table 1 may illustrate aspects of one step of such a channel mapping operation, and other steps may include various changes in the respective bit sequences. For example, such a channel mapping operation may include or be based on various sequences of mode register values (e.g., as a predefined sequence at a memory device 310, as a sequence of mode register write commands conveyed by a host device 350), and subsequent operations. For each respective set of mode register values, the memory device 310 may convey the corresponding signaling, and the host device 350 may detect or otherwise process a readout pattern (e.g., via host pins 365) to generate a mapping between pins.

Referring to the example above, which may be applicable to LPDDR4× and other memory applications or standards, a sub-sequence of operations for channel mapping may include setting the MR15, MR20, MR32, and MR40 values, issuing a calibration or configuration command (e.g., a command for a memory device 310 to convey signaling according to the set mode register values, a DQ calibration read command, an MPC RD DQ CAL command), reading a data channel pattern (e.g., reading a DQ pattern) at a host device 350, and recognizing a readout pattern (e.g., at a host device 350, at an SoC controller). In accordance with the example illustrated by Table 1, a first iteration of the sub-sequence of operations for detecting DQ0 and DQ8 may include MR15 and MR20 values of 0x01, a second iteration of the sub-sequence of operations for detecting DQ1 and DQ9 may include MR15 and MR20 values of 0x02, and so on, where the MR32 and MR40 values may be maintained for each of the iterations at 0xFF. After eight iterations (e.g., concluding with an iteration of the sub-sequence of operations for detecting DQ7 and DQ15), the host device 350 may determine a mapping for a pin mapper 380, which may include changing a DQ pin mapping configuration. In some examples, the result of such a mapping determination may be stored at the host device (e.g., in a non-volatile memory of or coupled with the host device 350-b), which the host device may refer to or otherwise access during a subsequent boot-up or initialization. In some examples, the mapping determination may be performed as part of a manufacturing or assembly operation, such that a stored determination may be available for loading and performing correspondingly configured communications during a first initialization or startup by a user.

Figure 5A:
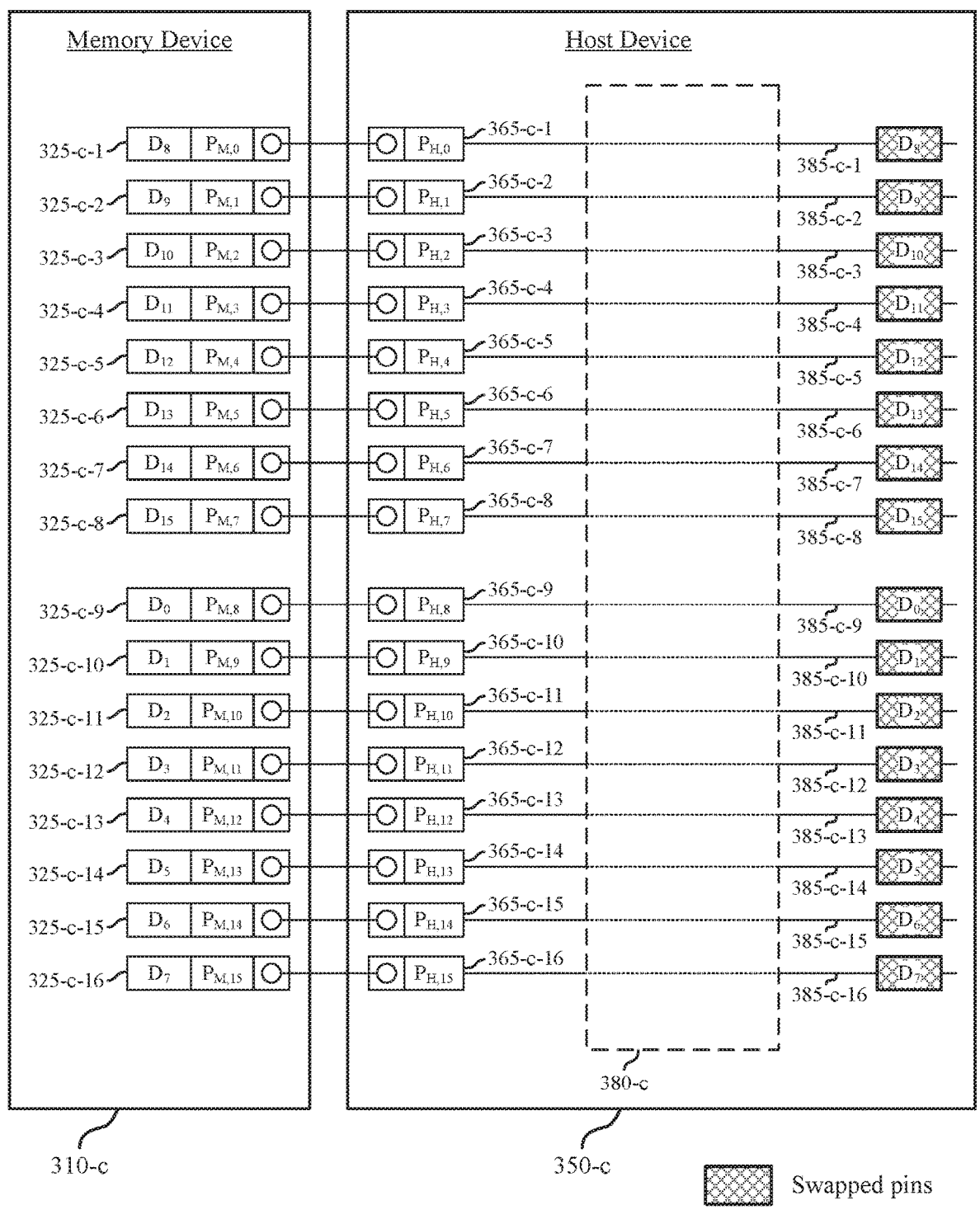
FIGS. 5A through 5C illustrate an example of a system that supports dynamic channel mapping for a memory system in accordance with examples as disclosed herein.
Figure 5B:
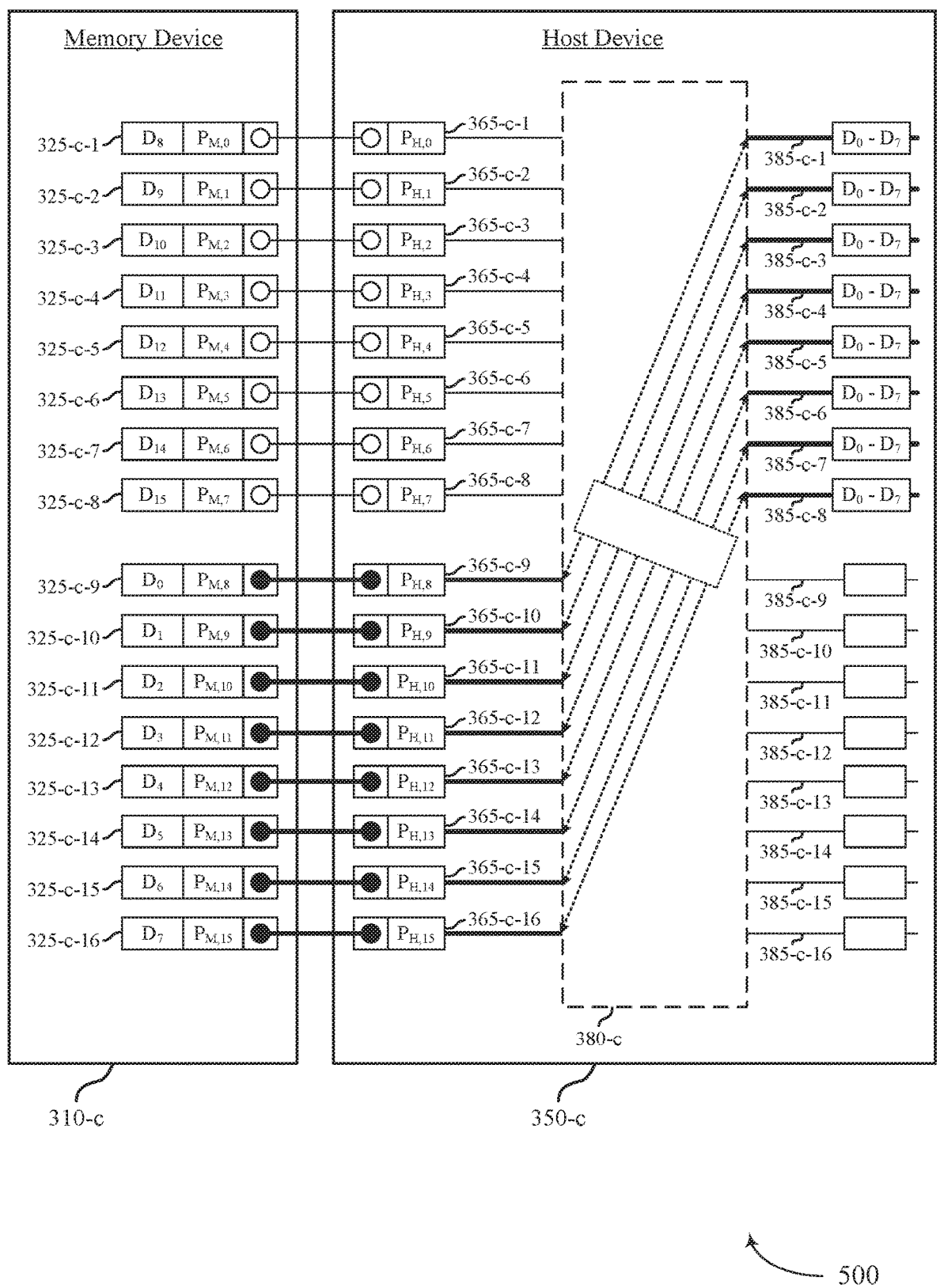
Figure 5C:
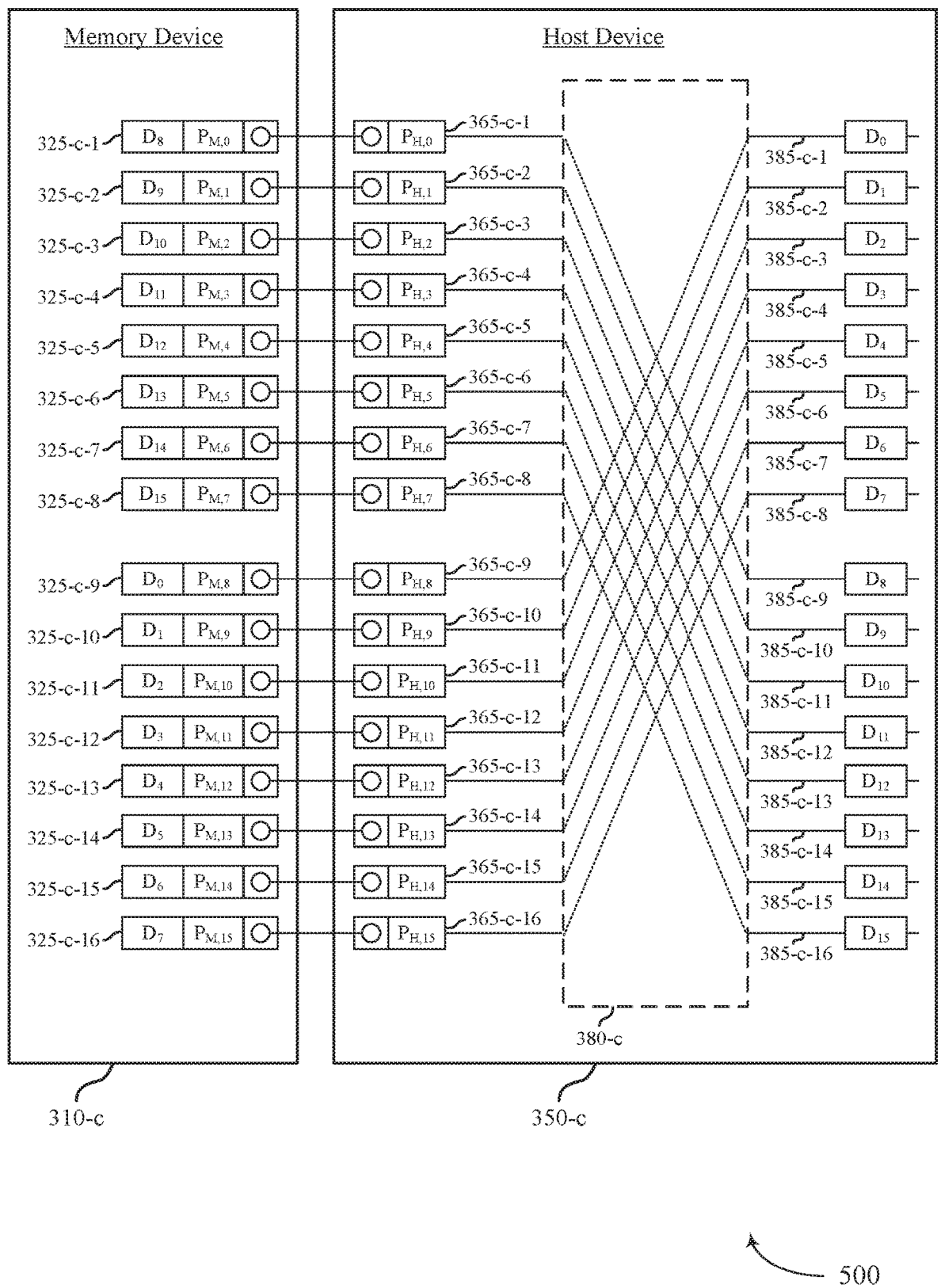

FIGS. 5A through 5C illustrate an example of a system 500 that supports dynamic channel mapping for a memory system in accordance with examples as disclosed herein. The system 500 includes a memory device 310-c and a host device 350-c, and may illustrate an example of byte-level mapping in accordance with the described techniques.

The system 500 may be configured with a channel (e.g., a data channel, a DQ channel) having sixteen information positions (e.g., data pins, DQ pins, logical pins, bit positions, bit numbers), which may be referred to as information positions $D_0$ through $D_{15}$. In some examples, each of the information positions may refer to a particular bit of the channel, and the information positions may be referred to as bit positions. For example, $D_0$ may refer to a most-significant bit and $D_{15}$ may refer to a least-significant bit, or $D_0$ may refer to a least-significant bit and $D_{15}$ may refer to a most-significant bit. In other examples, one or more of the information positions may refer to or otherwise correspond to more than a single bit of information, which may be supported by multi-level memory cells 205, multi-level modulation schemes, or other techniques.

The memory device 310-c may be configured with sixteen memory pins 325-c (e.g., memory pins 325-c-1 through 325-c-16, physical pins, signal paths, or interfaces), which may be referred to as $P_{M,0}$ through $P_{M,15}$. In the example of system 500, each of the information positions may be mapped to a respective one of the memory pins 325-c at the memory device 310-c according to a static mapping as shown (e.g., a mapping of information position $D_8$ with $P_{M,0}$ corresponding to memory pin 325-c-1). In other examples, each of the information positions may be mapped to a respective one of the memory pins 325-c at a memory device 310 according to a dynamic mapping (e.g., by a pin mapper of the memory device 310, not shown).

The host device 350-c may be configured with sixteen host pins 365-c (e.g., host pins 365-c-1 through 365-c-16, physical pins, signal paths, or interfaces), which may be referred to as $P_{H,0}$ through $P_{H,15}$. The host pins 365-c and the memory pins 325-c may be configured for a 1:1 mapping (e.g., a mapping between $P_{M,0}$ and $P_{H,0}$, between $P_{M,1}$ and $P_{H,1}$, and so on), which may include a physical mapping or connection (e.g., wiring, soldering, brazing, or other 1:1 coupling). The host device 350-c may also be configured with sixteen data pins 385-c (e.g., data pins 385-c-1 through 385-c-16) which may refer to physical signal paths or a logical construct used to order or sequence signaling conveyed via the host pins 365-c. Each of the data pins 385-c may be associated with one of the information positions $D_0$ through $D_{15}$, and each of the data pins 385-c or information positions $D_0$ through $D_{15}$ may be mapped with a respective host pin 365-c using the pin mapper 380-c.

In some examples, the host device 350-c may be configured for communications via the data pins 385-c (e.g., communications of the channel, which may be passed to or from other components of the host device 350-c) according to a sequential order of information positions, such as an ordering, from top to bottom, of a most-significant bit to a least-significant bit, or least-significant bit to most-significant bit. For example, the host device 350-c may be configured to communicate the first information position, $D_0$, via the data pin 385-c-1, communicate the second information position, $D_i$, via the data pin 385-c-2, and so on. In some examples, communications with a memory device 310 according to this configuration may be supported by a default or initial mapping between data pins 385-c and the host pins 365-c (e.g., a default or initial mapping between data pins 385-c and the memory pins 325-c, a first mapping used by the host device 350-c prior to performing channel mapping operations), such as the dotted line mapping of the pin mapper 380-c shown in FIG. 5A. However, in various examples, memory devices 310 may be configured with a different channel mapping that may be incompatible with such a default or initial mapping.

In the example of system 500, the memory device 310-c may be configured with a swapping of bytes (e.g., a swapping of eight information positions, a swapping of eight memory pins 325-c), such that a first set of information positions, $D_0$ through $D_7$ (e.g., a lower byte of the channel), are mapped to an upper grouping or byte of pins, $P_{M,8}$ through $P_{M,15}$, (e.g., corresponding to memory pins 325-c-9 through 325-c-16), and a second set of information positions, $D_8$ through $D_{15}$ (e.g., an upper byte of the channel), are mapped to a lower grouping or byte of pins, $P_{M,0}$ through $P_{M,7}$, (e.g., corresponding to memory pins 325-c-1 through 325-c-8). Though illustrated as a reordering of bytes at the memory device 310-c, it is to be understood that this is only one example configuration and conceptualization—in some cases, this may equivalently represent a coupling of $P_{M,0}$ through $P_{M,7}$ at the memory device 310-c with $P_{H,8}$ through $P_{H,15}$ at the host device 350-c and a coupling of $P_{M,8}$ through $P_{M,15}$ at the memory device 310-c with $P_{H,0}$ through $P_{H,7}$ at the host device 350-c (e.g., due to PCB layout considerations). Regardless of the conceptualization or physical implementation, from the perspective of the host device 350-c, the information positions from top to bottom (e.g., at the data pins 385-*c*) may not be arranged in a sequential order when the pin mapper 380-*c* is configured according to the default or initial mapping of FIG. 5A. Rather, as shown, information positions $D_0$ through $D_7$ may be swapped as a group with information positions $D_8$ through $D_{15}$, which may be referred to as a swapped byte of pins, a swapped byte of information positions, swapped bytes, swapped lines, or other descriptions. Such a swap of information positions (e.g., at the data pins 385-*c*) may, in some examples of the system 500, result in improper operation of the system 500 absent the channel mapping operations described herein.

In accordance with examples of the present disclosure, the system 500 may be configured to perform a dynamic channel mapping for the channel corresponding to information positions $D_0$ through $D_{15}$. For example, the memory device 310-*c* may convey signaling to the host device 350-*c* (e.g., via one or more of the memory pins 325-*c*, via one or more of the host pins 365-*c*) for a channel mapping operation, and the host device (e.g., the pin mapper 380-*c*) may determine a channel mapping based at least in part on receiving the signaling. Thus, the host device 350-*c* may be able to support different mappings between information positions and memory pins 325-*c* or host pins 365-*c*, which may improve performance or flexibility of the system 500 (e.g., improved flexibility to optimize the physical routing of signals between the memory device 310-*c* and the host device 350-*c* or other aspects of the system). In some examples, the described techniques may be described as enabling the host device 350-*c* to detect a DQ byte swapping condition of the memory device 310-*c*.

In one example, the memory device 310-*c* may transmit signaling according to a logic state via eight of the memory pins 325-*c*, or otherwise activate or enable eight of the memory pins 325-*c*, where such a signaling or activation may correspond to information positions known at the host device 350-*c* (e.g., based on a preconfiguration known to both the memory device 310-*c* and the host device 350-*c*, based on a command transmitted from the host device 350-*c* to the memory device 310-*c*). For example, as shown in FIG. 5B, to indicate memory pins 325-*c* or host pins 365-*c* corresponding to the information positions $D_0$ through $D_7$, the memory device 310-*c* may activate or transmit signaling of a logic state for the information positions $D_0$ through $D_7$ via the memory pins 325-*c*-9 through 325-*c*-16, which are coupled with the host pins 365-*c*-9 through 325-*c*-16. Although the default or initial mapping of FIG. 5A would have mapped the host pins 365-*c*-9 through 365-*c*-16 with the data pins 385-*c*-9 through 385-*c*-16, the host device 350-*c* may be configured to interpret the signaling of FIG. 5B as corresponding to the information positions $D_0$ through $D_7$, which should correspond to the data pins 385-*c*-1 through 385-*c*-8.

As shown in FIG. 5B, the host device 350-*c* (e.g., the pin mapper 380-*c*) may determine a mapping between the host pins 365-*c*-9 through 365-*c*-16 and the data pins 385-*c*-1 through 385-*c*-8, shown by the dotted lines within the pin mapper 380-*c*, based at least in part on the signaling received via the memory pins 325-*c*-9 through 325-*c*-16 and the host pins 365-*c*-9 through 365-*c*-16. In some examples, the determined mapping may include a 1:1 mapping between data pins 385-*c* and host pins 365-*c* or memory pins 325-*c*. In other examples, the determined mapping may include an 8:8 mapping (e.g., a byte-level mapping) between subsets of data pins 385-*c* and subsets of host pins 365-*c* or memory pins 325-*c*, which may be followed by operations that support a 1:1 mapping (e.g., the signaling or mapping described with reference to FIG. 4B, aspects of the bit sequences of Table 1).

Thus, according to various techniques, the host device 350-*c* (e.g., the pin mapper 380-*c*) may determine the mapping at the pin mapper 380-*c* illustrated in FIG. 5C (e.g., based on a sequence of signaling), where such a mapping may be referred to as or otherwise include a mapping of the information positions $D_0$ through $D_7$ or the data pins 385-*c*-1 through 385-*c*-8 with the host pins 365-*c*-9 through 365-*c*-16 or memory pins 325-*c*-9 through 365-*c*-16, and mapping the information positions $D_8$ through $D_{15}$ or the data pins 385-*c*-9 through 385-*c*-16 with the host pins 365-*c*-1 through 365-*c*-8 or memory pins 325-*c*-1 through 365-*c*-8. In some examples, such a mapping may be interpreted as swapping bytes of data pins 385-*c*, swapping bytes of host pins 365-*c*, swapping bytes of memory pins 325-*c*, or other interpretations or phrasings.

In some examples, signaling to support the described techniques for dynamic channel mapping may be based at least in part on mode register values at the memory device 310-*c*, which may be preconfigured at the memory device 310-*c* (e.g., as part of manufacturing process, a fuseload process, or as trim parameters), or commanded by the host device 350-*c* (e.g., using mode register write commands). For example, Table 2 illustrates an example of bit sequences that may be signaled by a memory device 310 and received at a host device 350 to resolve a mapping between information positions (e.g., DQ pins) DQ0 through DQ15 of a DQ channel, which may be an example of information positions $D_0$ through $D_{15}$ of FIGS. 5A through 5C. In the example of Table 1, information positions may be divided at a byte level, where information positions DQ0 through DQ7 may correspond to a first byte (e.g., a lower byte) and information positions DQ8 through DQ15 may correspond to a second byte (e.g., an upper byte). Each of the bits of the respective bit sequence may refer to a unit interval of a data burst, or an instance of a data strobe, such that the indicated signaling may be an example of holding a same value or signaling bias for 16 unit intervals.

TABLE 2

Bit sequence to support byte-level channel mapping

| | | Invert | Bit Sequence | | | | | | | | | | | | | | | |
| --- | --- | --- | --- | --- | --- | --- | --- | --- | --- | --- | --- | --- | --- | --- | --- | --- | --- | --- |
| | | | MR40 | | | | | | | | MR32 | | | | | | | |
| | Pin | Invert | 15 | 14 | 13 | 12 | 11 | 10 | 9 | 8 | 7 | 6 | 5 | 4 | 3 | 2 | 1 | 0 |
| MR15 | DQ0 | No | 1 | 1 | 1 | 1 | 1 | 1 | 1 | 1 | 1 | 1 | 1 | 1 | 1 | 1 | 1 | 1 |
| | DQ1 | No | 1 | 1 | 1 | 1 | 1 | 1 | 1 | 1 | 1 | 1 | 1 | 1 | 1 | 1 | 1 | 1 |
| | DQ2 | No | 1 | 1 | 1 | 1 | 1 | 1 | 1 | 1 | 1 | 1 | 1 | 1 | 1 | 1 | 1 | 1 |
| | DQ3 | No | 1 | 1 | 1 | 1 | 1 | 1 | 1 | 1 | 1 | 1 | 1 | 1 | 1 | 1 | 1 | 1 |

TABLE 2-continued

Bit sequence to support byte-level channel mapping

| | | Invert | Bit Sequence | | | | | | | | | | | | | | | |
|---|---|---|---|---|---|---|---|---|---|---|---|---|---|---|---|---|---|---|
| | | | MR40 | | | | | | | | MR32 | | | | | | | |
| | Pin | Invert | 15 | 14 | 13 | 12 | 11 | 10 | 9 | 8 | 7 | 6 | 5 | 4 | 3 | 2 | 1 | 0 |
| MR20 | DMI0 | Never | 1 | 1 | 1 | 1 | 1 | 1 | 1 | 1 | 1 | 1 | 1 | 1 | 1 | 1 | 1 | 1 |
| | DQ4 | No | 1 | 1 | 1 | 1 | 1 | 1 | 1 | 1 | 1 | 1 | 1 | 1 | 1 | 1 | 1 | 1 |
| | DQ5 | No | 1 | 1 | 1 | 1 | 1 | 1 | 1 | 1 | 1 | 1 | 1 | 1 | 1 | 1 | 1 | 1 |
| | DQ6 | No | 1 | 1 | 1 | 1 | 1 | 1 | 1 | 1 | 1 | 1 | 1 | 1 | 1 | 1 | 1 | 1 |
| | DQ7 | No | 1 | 1 | 1 | 1 | 1 | 1 | 1 | 1 | 1 | 1 | 1 | 1 | 1 | 1 | 1 | 1 |
| | DQ8 | Yes | 0 | 0 | 0 | 0 | 0 | 0 | 0 | 0 | 0 | 0 | 0 | 0 | 0 | 0 | 0 | 0 |
| | DQ9 | Yes | 0 | 0 | 0 | 0 | 0 | 0 | 0 | 0 | 0 | 0 | 0 | 0 | 0 | 0 | 0 | 0 |
| | DQ10 | Yes | 0 | 0 | 0 | 0 | 0 | 0 | 0 | 0 | 0 | 0 | 0 | 0 | 0 | 0 | 0 | 0 |
| | DQ11 | Yes | 0 | 0 | 0 | 0 | 0 | 0 | 0 | 0 | 0 | 0 | 0 | 0 | 0 | 0 | 0 | 0 |
| | DMI1 | Never | 0 | 0 | 0 | 0 | 0 | 0 | 0 | 0 | 0 | 0 | 0 | 0 | 0 | 0 | 0 | 0 |
| | DQ12 | Yes | 0 | 0 | 0 | 0 | 0 | 0 | 0 | 0 | 0 | 0 | 0 | 0 | 0 | 0 | 0 | 0 |
| | DQ13 | Yes | 0 | 0 | 0 | 0 | 0 | 0 | 0 | 0 | 0 | 0 | 0 | 0 | 0 | 0 | 0 | 0 |
| | DQ14 | Yes | 0 | 0 | 0 | 0 | 0 | 0 | 0 | 0 | 0 | 0 | 0 | 0 | 0 | 0 | 0 | 0 |
| | DQ15 | Yes | 0 | 0 | 0 | 0 | 0 | 0 | 0 | 0 | 0 | 0 | 0 | 0 | 0 | 0 | 0 | 0 |

In the example of Table 2, a bit sequence may be conveyed on respective signal paths (e.g., memory pins 325, host pins 365) for each of the respective information positions. A default sequence or default data for the bit sequences may be a string of sixteen ones (or other logic state), which may be controlled by mode registers MR40 and MR32 (e.g., according to a LPDDR4x configuration). For example, to support the channel mapping operation, each of the mode registers MR40 and MR32 may be set to hexadecimal values of 0xFF (e.g., 11111111). In some examples, such values may be commanded or written by the host device 350, and may or may not be the same values used in other operations (e.g., for communicating information before or after the channel mapping operation).

Continuing with the example of Table 2, the signaling for a particular information position or signal path may be controlled by an inversion flag corresponding to the respective information position or signal path. Table 2, for example, may refer to a configuration for detecting information positions DQ8 through DQ15, where each of the information positions DQ8 through DQ15 may be set with an "invert" bit or flag. Thus, the signaling conveyed for information positions DQ8 through DQ15 may be inverted to a string of sixteen zeros, whereas the signaling conveyed for information positions DQ0 through DQ7 may not be inverted, and accordingly convey the default string of sixteen ones. Such an inversion setting may be controlled by mode registers MR15 and MR20. For example, to support the inversion of information positions DQ8 through DQ15, mode register MR20 may be set to 0xFF (e.g., 11111111), and the default signaling of information positions DQ0 through DQ7, mode register MR15 may be set to 0x00 (e.g., 00000000). In other words, to support the described channel mapping, the information or signaling for a target data byte may be inverted by a particular value of mode registers MR15 and MR20.

In accordance with the described techniques, the host device 350 may identify which subset of host pins 365 or memory pins 325 correspond to the information positions DQ8 through DQ15 by identifying which subset of host pins 365 or memory pins 325 are carrying signaling corresponding to sixteen zeros (e.g., in contrast with another subset of host pins 365 or memory pins 325 conveying signaling corresponding to sixteen ones), and determine a mapping between the identified subset of host pins 365 or memory pins 325 and a corresponding subset of data pins 385. More generally, to support some examples of channel mapping, the host device 350 may be configured to identify which subset of memory pins 325 or host pins 365 has been activated (e.g., according to an inversion setting, according to signaling or voltage of the respective pins).

Performing a byte-level mapping, such as the techniques described herein, may be beneficial to systems (e.g., memory device 310, host devices 350) configured with certain byte-level characteristics. For example, according to some memory standards (e.g., low-power memory standards such as LPDDR4x or LPDDR5), a memory device 310 or a host device 350 may be configured for transferring eight bits (e.g., one byte) of information at a time. When such devices include a channel having more than eight information positions or signal paths (e.g., more than eight bits of signal paths, more than one byte of signal paths), for example, it may be indeterminate which of the signal paths are meant to correspond to the eight information positions of the information transfer. For example, the information may be conveyed via an upper byte or a lower byte, which may be different from one memory device 310 to another memory device, or different from one host device 350 to another host device 350. Thus, a byte-level mapping, such as the techniques described herein, may be performed to identify which of a subset of memory pins 325 or which of a subset of host pins 365 are to be mapped to a subset of data pins 385 (e.g., for communications according to a byte of information transfer).

Although the described techniques refer to specific mode registers that may be used to support dynamic channel mapping, other mode registers may be used in accordance with examples as disclosed herein. For example, aspects discussed with reference to mode registers MR15, MR20, MR32, and MR40 may be applicable to systems operating according to LPDDR4x standards, whereas similar aspects may be applied to mode registers MR31, MR32, MR33, and MR34 in systems operating according to LPDDR5 standards. In other examples, such parameters may be stored in or accessed from different portions of a memory device 310, such storage elements or memory cells different from mode registers, or may be interpreted directly from a commanding host device 350.

Figure 6:
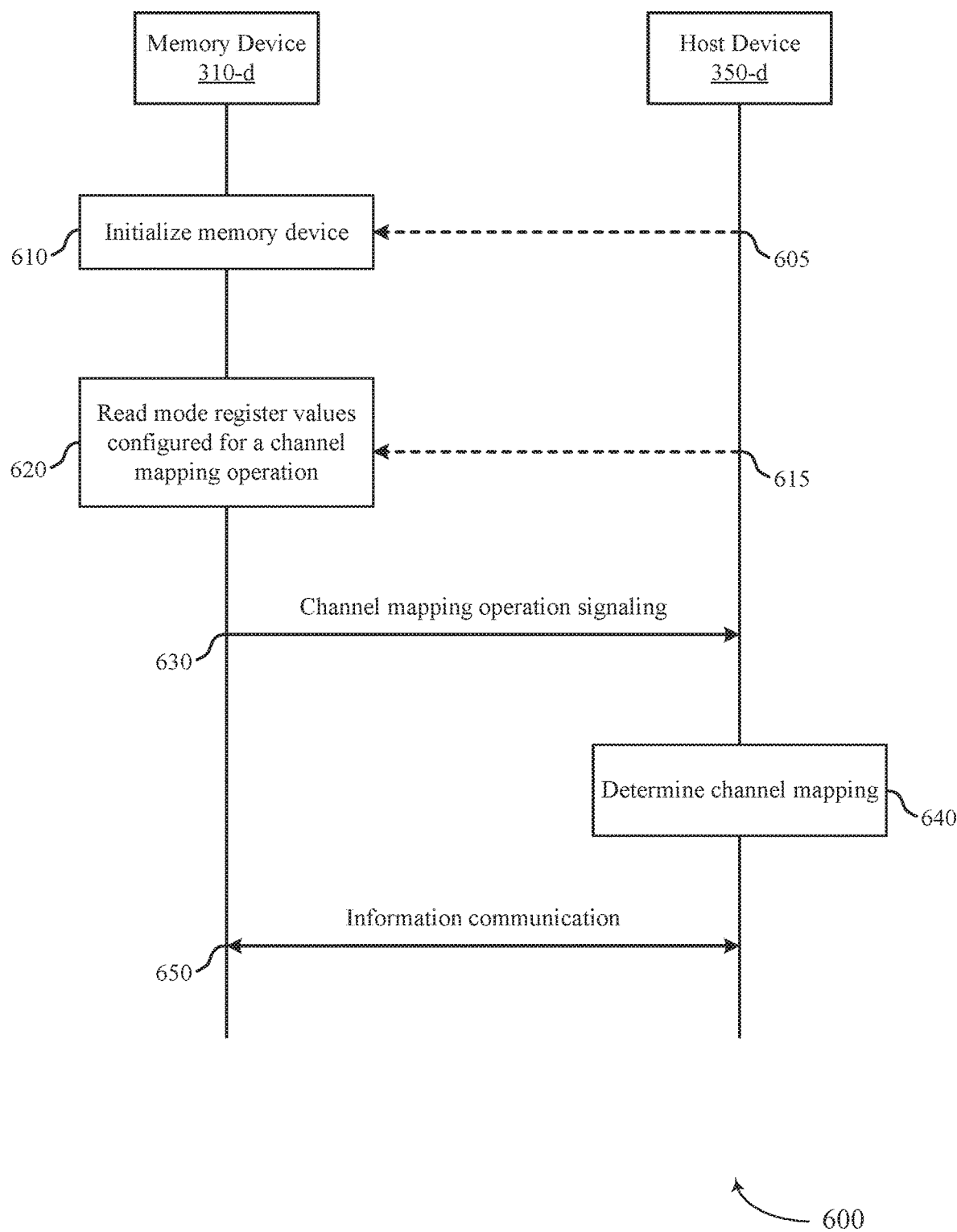
FIG. 6 illustrates a system and related operations that support dynamic channel mapping for a memory system in accordance with examples as disclosed herein.

FIG. 6 illustrates a system 600 and related operations that support dynamic channel mapping for a memory system in accordance with examples as disclosed herein. The system 600 includes a host device 350-d and a memory device 310-d that may be configured to be coupled with the host device 350-d (or, more generally, a host device 350 as described herein). The related operations of the system 600 illustrate one example for performing dynamic channel mapping in accordance with the described techniques.

At 610, the memory device 310-d may be initialized. In some examples, the initializing may be based at least in part on the memory device 310-d being powered on (e.g., receiving power). In some examples, the initializing may be based at least in part on the memory device 310-d receiving an initialization command. For example, at 605, the host device 350-d may transmit an initialization command, and the operations of 610 may be based at least in part on the memory device 310-d receiving the initialization command. In some examples, the initialization may be a first initialization of the memory device 310-d, such as a first initialization of the memory device 310-d after being coupled with or connected to (e.g., mounted to, installed on) the host device 350-d. In some examples, the initialization of 610 may include, or otherwise refer to a detection that a mapping operation needs to be performed (e.g., detecting an initial coupling, detecting an error in a channel mapping or other error state).

At 620, the memory device 310-d may read mode register values, or some other values stored at or received by the memory device 310-d, where the values may be configured for a channel mapping operation. In some examples, the mode register values may be preconfigured at the memory device 310-d, such as a sequence of mode register values that are preconfigured (e.g., as part of a set of instructions stored at the memory device 310-d) for the channel mapping operation. In some examples, the mode register values may be based at least in part on signaling received at the memory device 310-d. For example, at 615, the host device 350-d may issue one or more mode register write commands, and the operations of 620 may be based at least in part on the memory device 310-d receiving the mode register write commands. It is to be understood that, in implementations in which the signaling at 615 is performed, such signaling may occur at any time prior to the reading of the mode register values or other values at 620, including prior to the initializing at 610 (e.g., during a prior power cycle of the memory device 310-d).

In one example, mode register values or mode register write commands may be conveyed as part of a multi-purpose command (MPC) command, which may command various types of operations. In one example, according to certain standards (e.g., JEDEC standards), an MPC command may include a DQ calibration command, which may be used to support aspects of the described signaling. In some examples, the host device 350-d may configure a signaling pattern (e.g., for signaling of 630) through a write mode register (e.g., as part of a set of instructions stored at the host device 350-d). For example, in certain systems such as LPDDR4x, mode registers MR32, MR40, MR15, and MR20 may be used (e.g., as described with reference to Table 1 and Table 2). In other systems, such as LPDDR5, mode registers MR31, MR32, MR33, and MR34 may be used, which may be related to a Read DQ calibration (RDC) function. In some examples, the mode register values or other values may be referred to as inversion registers or inversion flags. In some examples, the signaling of 615 may be conveyed over a CA bus, which may include signaling via memory pins 335 or host pins 375 (e.g., pins separate from those conveying signaling of 630 for mapping of the subject channel) described with reference to FIG. 3.

At 630, the memory device 310-d may transmit channel mapping operation signaling based at least in part on the mode register values, or other values. For example, the memory device 310-d may transmit bit sequences, such as those described with reference to Tables 1 and 2, or otherwise convey signaling or pin activations such as those described with reference to FIG. 4B or 5B. In some examples, the signaling of 630 may be performed at a slower rate than other communications (e.g., the communications of 650). For example, to support the described channel mapping techniques, default settings of the memory device 310-d or the host device 350-d (e.g., default WL, RL, nRTP, nWR, CA settings) may be sufficient. Moreover, the signaling of 630 may include a data pattern set to continuous fixed level burst (burst 1, burst 0), which may be simpler and more robust to aspects such as a signal integrity timing margin. In some examples, the signaling of 630 may be performed at 200 MHz or 300 MHz (e.g., compared to a faster rate for communications), which may also be associated with CA timing having an improved margin (e.g., compared to other signaling rates). In various examples, performing the signaling of 630 at a slower rate may reduce the impact of noise or other signal integrity issues on the channel mapping operation.

In some examples, the operations of 620 and 630, and 615, where applicable, may be repeated. For example, the operations of 615, 620, and 630 may be repeated for one or more bytes of a byte-level detection, or may be repeated for one or more bits of a bit-level detection. In some examples, such repetitions may be performed according to different mode register values or other values, including repetitions of subsets of operations described with reference to FIGS. 4A through 4C.

At 640, the host device 350-d may determine a channel mapping based at least in part on the channel mapping operation signaling. For example, the host device 350-d may compare a received data pattern (e.g., related to the signaling 630) to a preset or otherwise configured data pattern (e.g., an expected data pattern, expected signaling for one or more information positions). In some examples, the channel mapping determined at 640 may include a rerouting of signal paths (e.g., by a multiplexer, by a transistor network). In some examples, the host device 350-d (e.g., an SoC controller) may remap channel pins (e.g., DQ pins) in software or other processing of the host device 350-d. Using either approach, or some combination thereof, the memory device 310-d can be correctly accessed with proper channel mapping (e.g., DQ mapping). If the host device 350-d does not successfully determine a channel mapping at 640, the host device 350-d may repeat one or more of the preceding steps to support a successful determination or confirmation. If the host device 350-d is still unable to make such a determination, the host device 350-d may proceed with other operations, such as training operations, or other component validation or rejection operations.

At 650, the memory device 310-d and the host device 350-d may communicate information based at least in part on the mapping determined at 640. For example, the host device 350-d may receive signaling over a set of pins and map or route the signaling according to the determined mapping. In one example, the host device 350-d may map signaling received over a set of host pins 365 (e.g., related to a read operation), and route the received signaling to different data pins 385 prior to conveying related signaling to another portion of the host device 350-d (e.g., to an external memory controller 105). In another example, the host device 350-*d* may map signaling received over a set of data pins 385 (e.g., at a pin mapper 380, related to a write operation), and route the received signaling to different host pins 365 prior to conveying related signaling to the memory device 310-*d*. In some examples, the memory device may be configured to transmit or receive the signaling of 650 (e.g., for a read command) based at least in part on having transmitted the channel mapping operation signaling 630, or otherwise determining that a channel mapping operation has been performed, or that the channel mapping of 640 has been determined.

Although one or more of the operations of 605 through 640 may be repeated at each startup or bootup of the system 600, such repetitions may delay operations of the system 600. Thus, the host device 350-*d* may be configured with (e.g., include, be coupled with) non-volatile storage that may be written with aspects of the determination of 640, and such storage may be accessed and loaded during other startup events after the determination of 640 (e.g., in cases where connectivity between the memory device 310-*d* and the host device 350-*d* is stable). Thus, communications of 650 may be supported despite intervening shutdowns or startups. In some cases, the operations of 605 through 640 may be triggered based on detecting a change of pin mapping, such as a coupling with a different memory device 310, or a change in mapping configuration of the memory device 310-*d* itself.

For dual rank or other multiple rank components (e.g., a dual rank memory device 310-*d*, a dual rank host device 350-*d*), the system 600 may perform one or more of the operations of 605 through 640 for each rank. However, in some examples each rank should have the same result, so that, in some examples, the operations of 605 through 640 may be performed for one rank, and a channel mapping determined at 640 may be applied to other ranks. Moreover, although the system 600 is illustrated with reference to a single memory device 310-*d*, any one or more of the operations of 605 through 650 may be performed for another memory device 310 different than (e.g., in addition to) the memory device 310-*d*.

Figure 7:
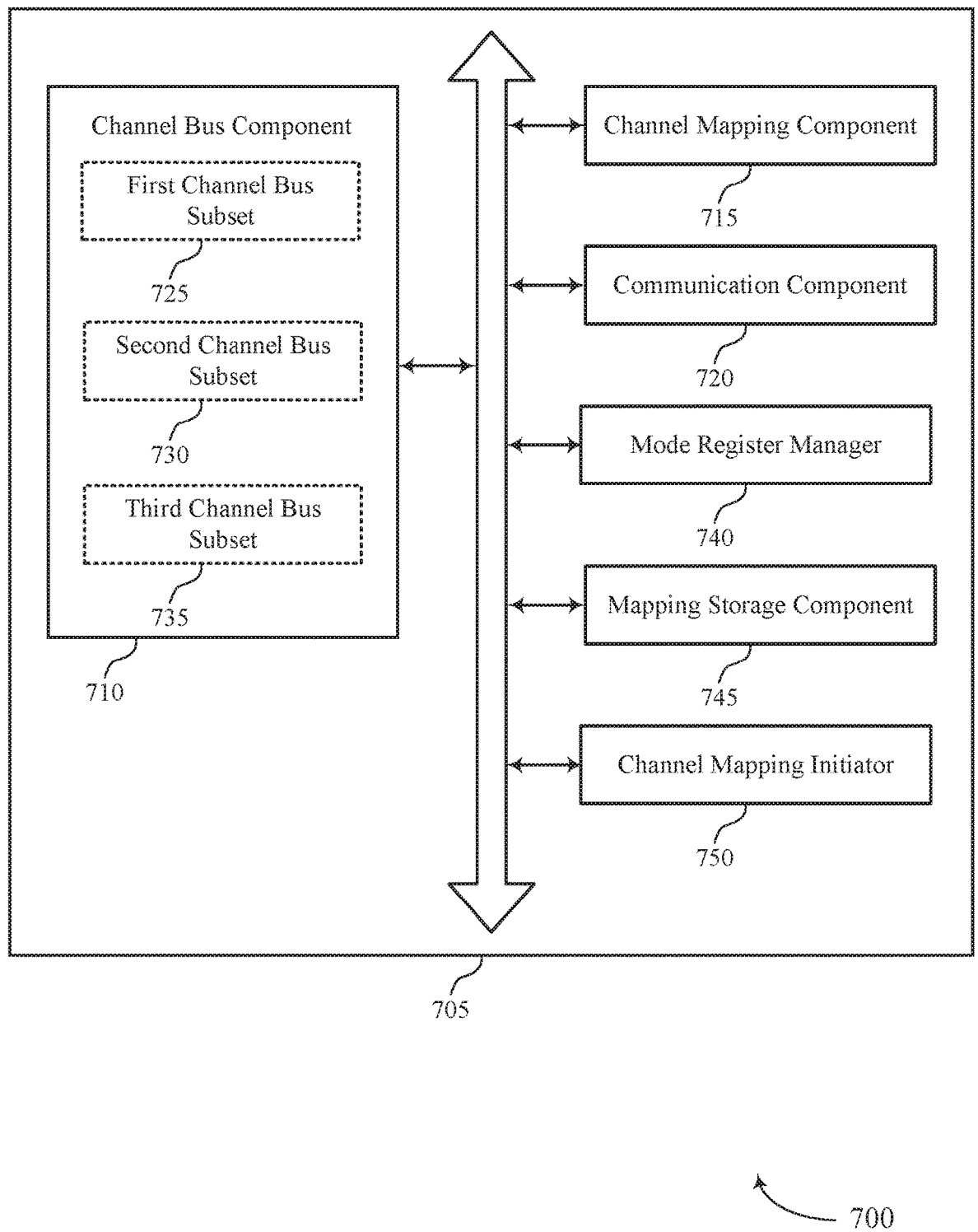
FIG. 7 shows a block diagram of a host device that supports dynamic channel mapping for a memory system in accordance with examples as disclosed herein.

FIG. 7 shows a block diagram 700 of a host device 705 that supports dynamic channel mapping for a memory system in accordance with examples as disclosed herein. The host device 705 may be an example of aspects of a host device as described with reference to FIGS. 1 through 6. The host device 705 may include a channel bus component 710, a channel mapping component 715, a communication component 720, a first channel bus subset 725, a second channel bus subset 730, a third channel bus subset 735, a mode register manager 740, a mapping storage component 745, and a channel mapping initiator 750. Each of these modules may communicate, directly or indirectly, with one another (e.g., via one or more buses).

The channel bus component 710 may be configured for receiving, from a memory device, over one or more pins (e.g., a set of pins) that are associated with a data channel (e.g., a set conductive interfaces of the host device that are configured for conveying signals of the data channel, a set of conductive interfaces coupled with signal paths of the data channel), signaling for a channel mapping operation. In some cases, the channel bus component may include or be divided according to various subsets or subcomponents (e.g., a first channel bus subset 725, a second channel bus subset 730, a third channel bus subset 735, or others), where such subsets or subcomponents may refer to physically distinct, grouped, or configured components, or may refer to subsets or subcomponents that are divided or distinct for a particular configuration or signaling operation (e.g., a dynamic distinction different than a static or physical distinction).

The channel mapping component 715 may be configured for determining, based on the received signaling, a mapping between each (e.g., respective) pin of the set of pins of the host device and a respective one of a set of pins of the memory device (e.g., physical pins, logical pins, data pins, information positions).

In some examples, the plurality of pins of the memory device includes a first subset of one or more pins and a second subset of one or more pins, and the channel mapping component 715 may be configured for determining whether a subset of one or more of the set of pins of the host device is coupled with the first subset or the second subset.

In some examples, a first subset of one or more pins is a first byte-level subset and a second subset of one or more pins is a second byte-level subset, and the channel mapping component 715 may be configured for determining whether a byte-level subset of the set of pins of the host device corresponds to the first byte-level subset or the second byte-level subset.

In some examples, the channel mapping component 715 may map each of the set of pins of the memory device to a respective information position (e.g., bit position) of the data channel.

In some examples, the channel mapping component 715 may identify respective logic values conveyed by one or more of the set of pins of the memory device.

In some examples, the channel mapping component 715 may compare the respective logic values of the one or more of the set of pins to a sequence of logic values (e.g., a predefined sequence of logic values, a commanded sequence of logic values).

In some examples, the channel mapping component 715 may identify activated ones of the set of pins of the memory device.

In some examples, the channel mapping component 715 may compare the activated ones of the set of pins to a predefined activation sequence (e.g., a predefined activation sequence, a commanded activation sequence).

The communication component 720 may be configured for communicating information (e.g., to the memory device, with the memory device, information from the host device for a write operation, information to the host device from a read operation) via the data channel based on the mapping. In some cases, the communicating is performed according to a faster rate (e.g., signaling rate, signaling frequency, modulation rate, modulation frequency, baud rate) than the signaling associated with the channel mapping operation.

In some examples, the plurality of pins of the host device comprises a first subset of one or more pins and a second subset of one or more pins, and receiving the signaling may include the first channel bus subset 725 receiving first signaling indicative of a first logic state over the first subset of one or more pins, and the second channel bus subset 730 receiving second signaling indicative of a second logic state over the second subset of one or more pins.

In some cases, the first subset of one or more pins is a single pin and the second subset of one or more pins is a set of pins. In some cases, the first subset of one or more pins is a first byte-level subset and the second subset of one or more pins is a second byte-level subset.

In some examples, the first channel bus subset 725 may receive, after receiving the first signaling and the second signaling, third signaling indicative of the second logic state over the first subset of one or more pins.

In some examples, the second channel bus subset 730 may receive, after receiving the first signaling and the second signaling, fourth signaling indicative of the first logic state over the second subset of one or more pins.

The third channel bus subset 735 may receive third signaling indicative of the first logic state over a third subset of one or more pins of the set of pins of the host device.

In some cases, the third subset of one or more pins is a single pin.

The mode register manager 740 may transmit command signaling corresponding to a set of mode register values (e.g., a set of one or more write commands, one or more commands to write a set of values to a set of mode registers, a set of one or more channel mapping commands that access or are otherwise based on the mode register values), where the signaling is based on the set of mode register values.

The mapping storage component 745 may write the mapping to memory included in the host device or to a second memory device coupled with the host device.

The channel mapping initiator 750 may initiate (e.g., by the host device) the channel mapping operation.

In some examples, the channel mapping initiator 750 may transmit a command to the memory device.

In some examples, the channel mapping initiator 750 may initialize power to the memory device.

Figure 8:
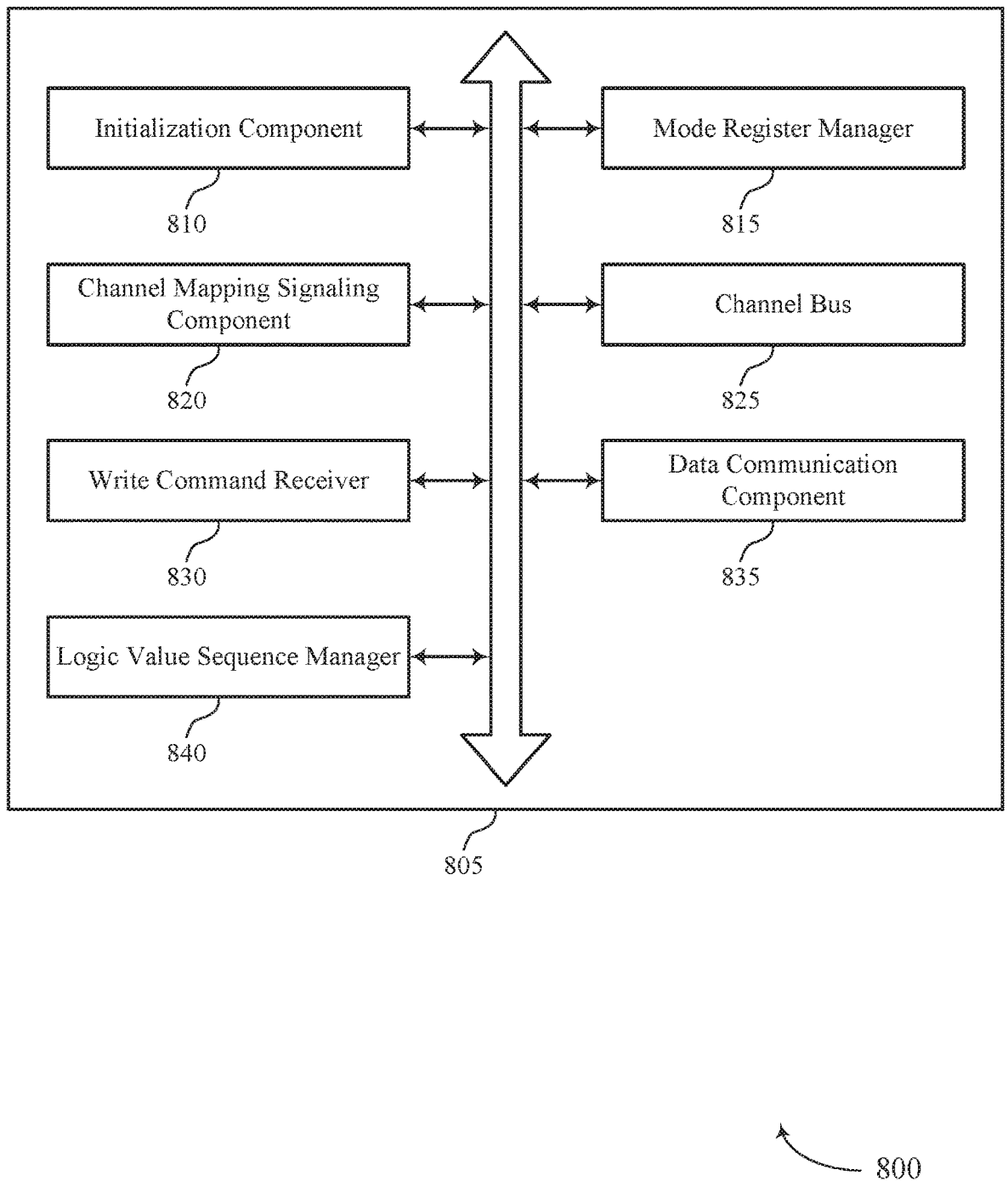
FIG. 8 shows a block diagram of a memory device that supports dynamic channel mapping for a memory system in accordance with examples as disclosed herein.

FIG. 8 shows a block diagram 800 of a memory device 805 that supports dynamic channel mapping for a memory system in accordance with examples as disclosed herein. The memory device 805 may be an example of aspects of a memory device as described with reference to FIGS. 1 through 6. The memory device 805 may include an initialization component 810, a mode register manager 815, a channel mapping signaling component 820, a channel bus 825, a write command receiver 830, a data communication component 835, and a logic value sequence manager 840. Each of these modules may communicate, directly or indirectly, with one another (e.g., via one or more buses).

The initialization component 810 may initialize the memory device coupled with or in electronic communication with a host device via a set of pins of the memory device that are associated with a data channel (e.g., a set conductive interfaces of the host device that are configured for conveying signals of the data channel, a set of conductive interfaces coupled with signal paths of the data channel).

In some examples, the initialization component 810 may receive a command from the host device.

In some examples, the initialization component 810 may receive power from the host device.

The mode register manager 815 may read one or more mode register values (e.g., a set of mode register values) configured for a channel mapping operation based on the initializing.

The channel mapping signaling component 820 may transmit signaling for the channel mapping operation to the host device over the set of pins based on the set of mode register values.

In some cases, the signaling for the channel mapping operation is configured for mapping each of the set of pins of the memory device to a respective information position (e.g., bit position, logical pin, data pin) of the data channel.

In some examples, the memory device 805 may include a channel bus 825 associated with or including the pins of the memory device. In some cases, a first subset of one or more pins is a single pin and a second subset of one or more pins is a set of pins. In some cases, a first subset of one or more pins is a first byte-level subset and a second subset of one or more pins is a second byte-level subset.

In some examples, the plurality of pins of the memory device includes a first subset of one or more pins and a second subset of one or more pins, and the channel mapping signaling component 820 may transmit first signaling indicative of a first logic state over the first subset of one or more pins, or transmit second signaling indicative of a second logic state over the second subset of one or more pins.

In some examples, the channel mapping signaling component 820 may transmit third signaling indicative of the first logic state over a third subset of one or more of the set of pins.

In some examples, the channel mapping signaling component 820 may transmit, after transmitting the first signaling and the second signaling, third signaling indicative of the second logic state over the first subset of one or more pins.

In some examples, the channel mapping signaling component 820 may transmit, after transmitting the first signaling and the second signaling, fourth signaling indicative of the first logic state over the second subset of one or more pins.

The write command receiver 830 may receive, from the host device, a set of one or more commands to write a set of values to a set of mode registers.

The data communication component 835 may support communicating data with the host device over the data channel. In some cases, the signaling for the channel mapping operation is performed according to a slower rate (e.g., signaling rate, signaling frequency, modulation rate, modulation frequency, baud rate) than communicating data with the host device over the data channel.

The logic value sequence manager 840 may manage aspects of a sequence of logic values that support the described signaling for the channel mapping operation. In some cases, the signaling is based on a sequence of logic values (e.g., a predefined sequence of logic values stored of interpreted by the logic value sequence manager 840, a commanded sequence of logic values understood by the logic value sequence manager 840).

Figure 9:
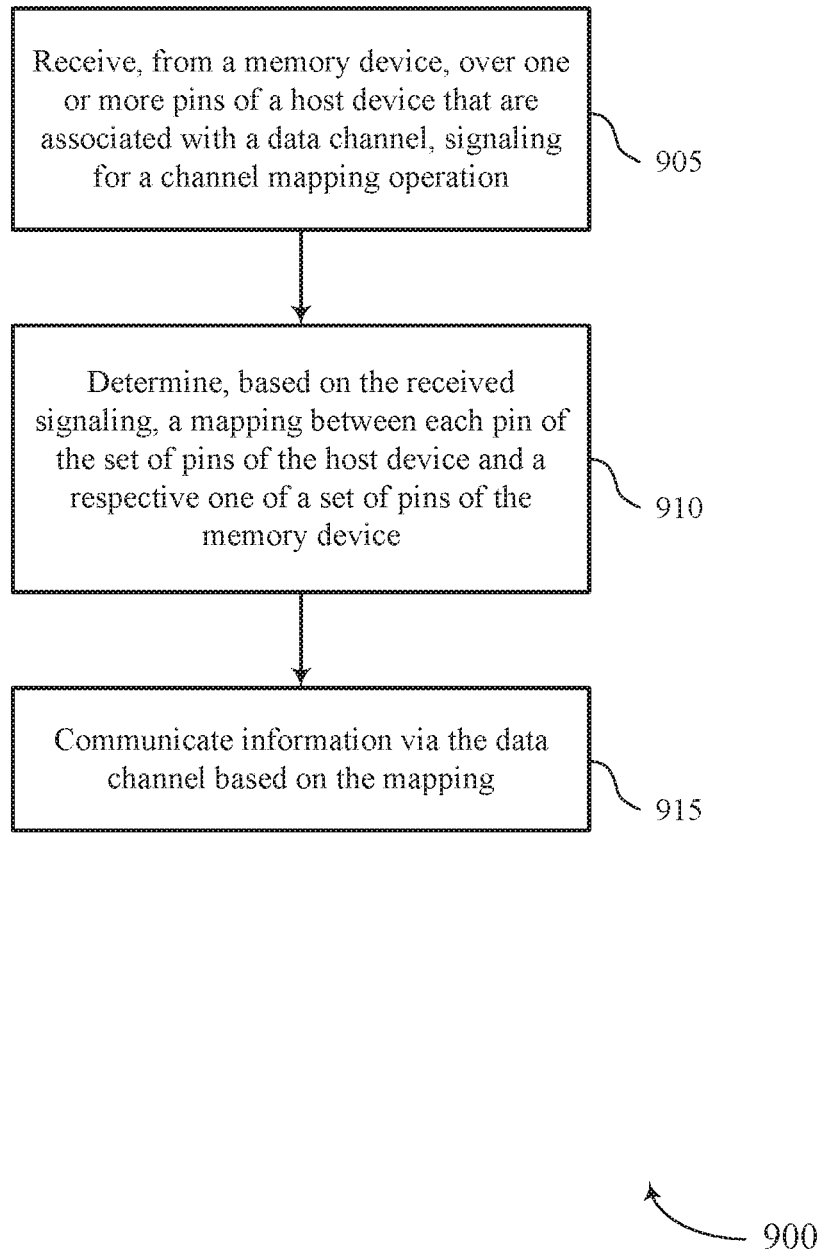
FIGS. 9 and 10 show flowcharts illustrating a method or methods that support dynamic channel mapping for a memory system in accordance with examples as disclosed herein.

FIG. 9 shows a flowchart illustrating a method or methods 900 that supports dynamic channel mapping for a memory system in accordance with examples as disclosed herein. The operations of method 900 may be implemented by a host device or its components as described herein. For example, the operations of method 900 may be performed by a host device as described with reference to FIG. 7. In some examples, a host device may execute a set of instructions to control the functional elements of the host device to perform the described functions. Additionally or alternatively, a host device may perform aspects of the described functions using special-purpose hardware.

At 905, the host device may receive, from a memory device, over one or more pins (e.g., a set of pins) of the host device that are associated with a data channel (e.g., a set conductive interfaces of the host device that are configured for conveying signals of the data channel, a set of conductive interfaces coupled with signal paths of the data channel), signaling for a channel mapping operation. The operations of 905 may be performed according to the methods described herein. In some examples, aspects of the operations of 905 may be performed by a channel bus component as described with reference to FIG. 7.

At 910, the host device may determine, based on the received signaling, a mapping between each (e.g., respective) pin of the set of pins of the host device and a respective one of a set of pins of the memory device. The operations of 910 may be performed according to the methods described herein. In some examples, aspects of the operations of 910 may be performed by a channel mapping component as described with reference to FIG. 7.

At 915, the host device may communicate information (e.g., to the memory device, with the memory device, information from the host device for a write operation, information to the host device from a read operation) via the data channel based on the mapping. The operations of 915 may be performed according to the methods described herein. In some examples, aspects of the operations of 915 may be performed by a communication component as described with reference to FIG. 7.

In some examples, an apparatus as described herein may perform a method or methods, such as the method 900. The apparatus may include circuitry, features, means, or instructions (e.g., a non-transitory computer-readable medium storing instructions executable by a processor) for receiving, from a memory device, over one or more pins (e.g., a set of pins) of a host device that are associated with a data channel (e.g., a set conductive interfaces of the host device that are configured for conveying signals of the data channel, a set of conductive interfaces coupled with signal paths of the data channel), signaling for a channel mapping operation, determining, at the host device, based on the received signaling, a mapping between each (e.g., respective) pin of the set of pins of the host device and a respective one of a set of pins of the memory device, and communicating information (e.g., to the memory device, with the memory device, information from the host device for a write operation, information to the host device from a read operation) via the data channel based on the mapping.

In some examples of the method 900 and the apparatus described herein, the set of pins of the memory device includes a first subset of one or more pins and a second subset of one or more pins, and determining the mapping may include operations, circuitry, features, means, or instructions for determining whether a subset of one or more of the set of pins of the host device may be coupled with the first subset or the second subset.

In some examples of the method 900 and the apparatus described herein, the first subset of one or more pins may be a first byte-level subset and the second subset of one or more pins may be a second byte-level subset, and determining the mapping may include operations, circuitry, features, means, or instructions for determining whether a byte-level subset of the set of pins of the host device corresponds to the first byte-level subset or the second byte-level subset.

In some examples of the method 900 and the apparatus described herein, the set of pins of the host device includes a first subset of one or more pins and a second subset of one or more pins, and receiving the signaling comprises may include operations, circuitry, features, means, or instructions for receiving first signaling indicative of a first logic state over the first subset of one or more pins, and receiving second signaling indicative of a second logic state over the second subset of one or more pins.

In some examples of the method 900 and the apparatus described herein, the first subset of one or more pins may be a single pin and the second subset of one or more pins may be a plurality of pins.

Some examples of the method 900 and the apparatus described herein may further include operations, circuitry, features, means, or instructions for receiving third signaling indicative of the first logic state over a third subset of one or more pins of the set of pins of the host device.

In some examples of the method 900 and the apparatus described herein, the third subset of one or more pins may be a single pin.

In some examples of the method 900 and the apparatus described herein, receiving the signaling may include operations, circuitry, features, means, or instructions for receiving, after receiving the first signaling and the second signaling, third signaling indicative of the second logic state over the first subset of one or more pins, and receiving, after receiving the first signaling and the second signaling, fourth signaling indicative of the first logic state over the second subset of one or more pins.

In some examples of the method 900 and the apparatus described herein, the first subset of one or more pins may be a first byte-level subset and the second subset of one or more pins may be a second byte-level subset.

In some examples of the method 900 and the apparatus described herein, determining the mapping may include operations, circuitry, features, means, or instructions for mapping each of the set of pins of the memory device to a respective information position (e.g., bit position) of the data channel.

Some examples of the method 900 and the apparatus described herein may further include operations, circuitry, features, means, or instructions for transmitting, by the host device, command signaling corresponding to a set of mode register values (e.g., a set of one or more write commands, one or more commands to write a set of values to a set of mode registers, a set of one or more channel mapping commands that access or may be otherwise based on the mode register values), where the signaling may be based on the set of mode register values.

In some examples of the method 900 and the apparatus described herein, determining the mapping may include operations, circuitry, features, means, or instructions for identifying respective logic values conveyed by one or more of the set of pins of the memory device, and comparing the respective logic values of the one or more of the set of pins to a sequence of logic values (e.g., a predefined sequence of logic values, a commanded sequence of logic values).

Some examples of the method 900 and the apparatus described herein may further include operations, circuitry, features, means, or instructions for writing the mapping to memory included in the host device or to a second memory device coupled with the host device.

In some examples of the method 900 and the apparatus described herein, the communicating may be performed according to a faster rate (e.g., signaling rate, signaling frequency, modulation rate, modulation frequency, baud rate) than the signaling associated with the channel mapping operation.

Some examples of the method 900 and the apparatus described herein may further include operations, circuitry, features, means, or instructions for initiating, by the host device, the channel mapping operation.

In some examples of the method 900 and the apparatus described herein, the initiating may include operations, circuitry, features, means, or instructions for transmitting a command to the memory device.

In some examples of the method 900 and the apparatus described herein, the initiating may include operations, circuitry, features, means, or instructions for initializing power to the memory device.

In some examples of the method 900 and the apparatus described herein, determining the mapping may include operations, circuitry, features, means, or instructions for identifying activated ones of the set of pins of the memory device, and comparing the activated ones of the set of pins to a predefined activation sequence (e.g., a predefined activation sequence, a commanded activation sequence).

Figure 10:
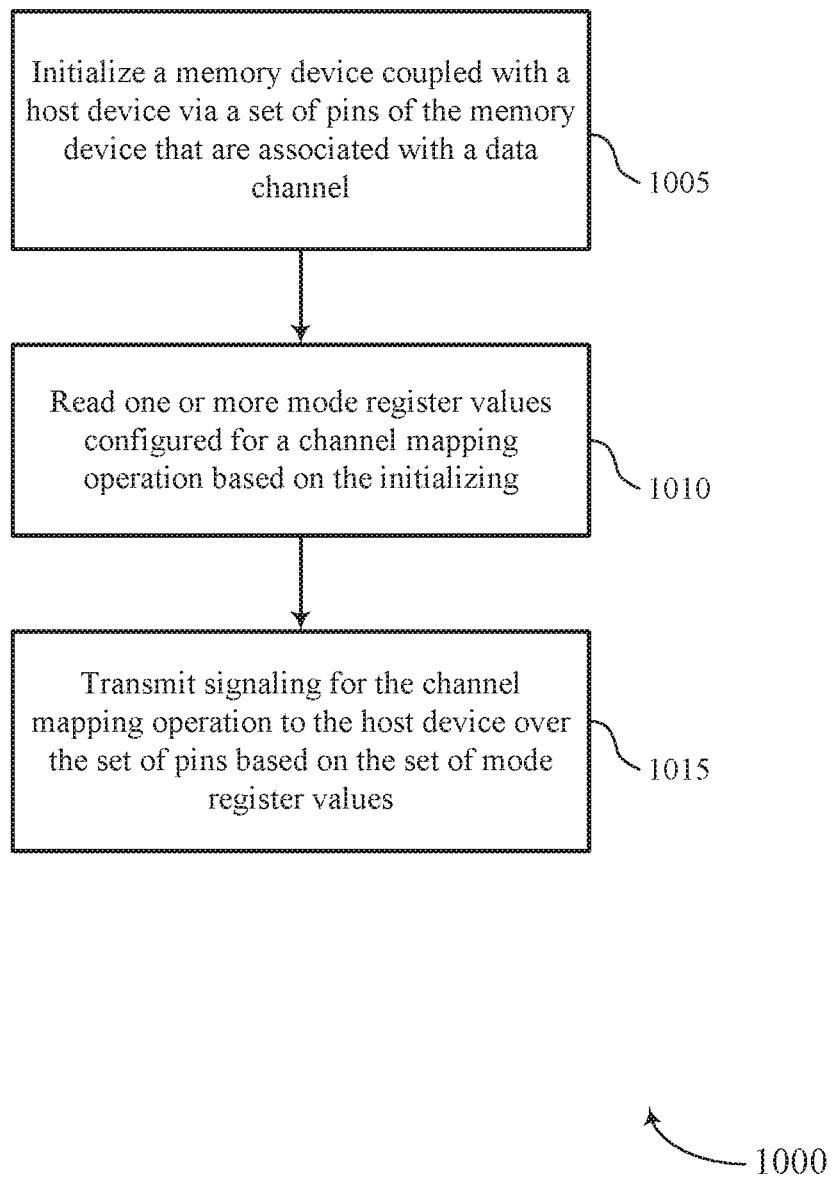

FIG. 10 shows a flowchart illustrating a method or methods 1000 that supports dynamic channel mapping for a memory system in accordance with examples as disclosed herein. The operations of method 1000 may be implemented by a memory device or its components as described herein. For example, the operations of method 1000 may be performed by a memory device as described with reference to FIG. 8. In some examples, a memory device may execute a set of instructions to control the functional elements of the memory device to perform the described functions. Additionally or alternatively, a memory device may perform aspects of the described functions using special-purpose hardware.

At 1005, the method may include initializing the memory device, which may be coupled with (e.g., in electronic communication with) a host device via a set of pins of the memory device that are associated with a data channel (e.g., a set conductive interfaces of the host device that are configured for conveying signals of the data channel, a set of conductive interfaces coupled with signal paths of the data channel). The operations of 1005 may be performed according to the methods described herein. In some examples, aspects of the operations of 1005 may be performed by an initialization component as described with reference to FIG. 8.

At 1010, the memory device may read one or more mode register values (e.g., a set of mode register values) configured for a channel mapping operation based on the initializing. The operations of 1010 may be performed according to the methods described herein. In some examples, aspects of the operations of 1010 may be performed by a mode register manager as described with reference to FIG. 8.

At 1015, the memory device may transmit signaling for the channel mapping operation to the host device over the set of pins based on the set of mode register values. The operations of 1015 may be performed according to the methods described herein. In some examples, aspects of the operations of 1015 may be performed by a channel mapping signaling component as described with reference to FIG. 8.

In some examples, an apparatus as described herein may perform a method or methods, such as the method 1000. The apparatus may include circuitry, features, means, or instructions (e.g., a non-transitory computer-readable medium storing instructions executable by a processor) for initializing a memory device coupled with (e.g., in electronic communication with) a host device via a set of pins of the memory device that are associated with a data channel (e.g., a set conductive interfaces of the host device that are configured for conveying signals of the data channel, a set of conductive interfaces coupled with signal paths of the data channel), reading one or more mode register values (e.g., a set of mode register values) configured for a channel mapping operation based on the initializing, and transmitting signaling for the channel mapping operation to the host device over the set of pins based on the set of mode register values.

In some examples of the method 1000 and the apparatus described herein, the set of pins of the memory device includes a first subset of one or more pins and a second subset of one or more pins, and transmitting the signaling may include operations, circuitry, features, means, or instructions for transmitting first signaling indicative of a first logic state over the first subset of one or more pins, and transmitting second signaling indicative of a second logic state over the second subset of one or more pins.

In some examples of the method 1000 and the apparatus described herein, the first subset of one or more pins may be a single pin and the second subset of one or more pins may be a plurality of pins.

Some examples of the method 1000 and the apparatus described herein may further include operations, circuitry, features, means, or instructions for transmitting third signaling indicative of the first logic state over a third subset of one or more of the plurality of pins.

In some examples of the method 1000 and the apparatus described herein, the first subset of one or more pins may be a first byte-level subset and the second subset of one or more pins may be a second byte-level subset.

In some examples of the method 1000 and the apparatus described herein, transmitting the signaling may include operations, circuitry, features, means, or instructions for transmitting, after transmitting the first signaling and the second signaling, third signaling indicative of the second logic state over the first subset of one or more pins, and transmitting, after transmitting the first signaling and the second signaling, fourth signaling indicative of the first logic state over the second subset of one or more pins.

In some examples of the method 1000 and the apparatus described herein, the signaling for the channel mapping operation may be configured for mapping each of the set of pins of the memory device to a respective information position (e.g., bit position) of the data channel.

Some examples of the method 1000 and the apparatus described herein may further include operations, circuitry, features, means, or instructions for receiving, from the host device, a set of one or more commands to write a set of values to a set of mode registers.

In some examples of the method 1000 and the apparatus described herein, the signaling may be performed according to a slower rate (e.g., signaling rate, signaling frequency, modulation rate, modulation frequency, baud rate) than communicating data with the host device over the data channel.

In some examples of the method 1000 and the apparatus described herein, the signaling may be based on a sequence of logic values (e.g., a predefined sequence of logic values, a commanded sequence of logic values).

In some examples of the method 1000 and the apparatus described herein, the initializing may include operations, circuitry, features, means, or instructions for receiving a command from the host device.

In some examples of the method 1000 and the apparatus described herein, the initializing may include operations, circuitry, features, means, or instructions for receiving power from the host device.

It should be noted that the described methods are possible implementations, and that the operations and the steps may be rearranged or otherwise modified and that other implementations are possible. Furthermore, portions from two or more of the methods may be combined.

An apparatus is described. The apparatus may include a set of pins associated with a data channel and configured for electronic communication with a memory device (e.g., a set conductive interfaces of a host device that are configured for conveying signals of the data channel, a set of conductive interfaces coupled with signal paths of the data channel), and a controller (e.g., coupled with the set of pins). The controller may be configured to cause the apparatus to, receive, from the memory device, signaling for a channel mapping operation, determine, based on the received signaling, a mapping between each (e.g., respective) pin of the set of pins and a respective one of a set of pins of the memory device, and communicate information (e.g., information from a host device for a write operation, information to a host device from a read operation) with the memory device via the data channel based on the mapping.

In some examples, the plurality of pins of the memory device includes a first subset of one or more pins and a second subset of one or more pins, and, to determine the mapping, the controller may be configured to cause the apparatus to determine whether a subset of the set of pins may be coupled with the first subset or the second subset.

In some examples, the controller may be configured to cause the apparatus to determine whether a byte-level subset of the set of pins of the host device corresponds to the first byte-level subset or the second byte-level subset.

In some examples, the plurality of pins comprises a first subset of pins and a second subset of pins, and, to receive the signaling, the controller is configured to cause the apparatus to receive first signaling indicative of a first logic state over the first subset of pins, and receive second signaling indicative of a second logic state over the second subset of pins.

In some examples, the controller may be configured to cause the apparatus to receive, after receiving the first signaling and the second signaling, third signaling indicative of the second logic state over the first subset of pins, and receive, after receiving the first signaling and the second signaling, fourth signaling indicative of the first logic state over the second subset of pins.

In some examples, the controller may be configured to cause the apparatus to transmit command signaling corresponding to a set of mode register values (e.g., a set of one or more write commands, one or more commands to write a set of values to a set of mode registers, a set of one or more channel mapping commands that access or may be otherwise based on the mode register values), where the received signaling may be based on the set of mode register values.

In some examples, the controller may be configured to map each of the set of pins of the memory device to a respective information position (e.g., bit position) of the data channel.

In some examples, to determine the mapping, the controller may be configured to cause the apparatus to a logic value conveyed by one or more of the set of pins of the memory device, and compare the respective logic value of the one or more of the set of pins to a sequence of logic values (e.g., a predefined sequence of logic values, a commanded sequence of logic values).

In some examples, the communicating may be performed according to a faster rate than the signaling associated with the channel mapping operation.

In some examples, the controller may be configured to cause the apparatus to initiate the channel mapping operation.

An apparatus is described. The apparatus may include an array of memory cells of a memory device, a set of pins of the memory device that are associated with a data channel and configured for electronic communication with a host device (e.g., a set conductive interfaces of the memory device that are configured for conveying signals of the data channel, a set of conductive interfaces coupled with signal paths of the data channel), and a controller of the memory device. The controller may be configured to cause the apparatus to initialize the memory device, read a set of mode register values configured for a channel mapping operation based on the initializing, and transmit signaling of the channel mapping operation to the host device over the set of pins based on the set of mode register values.

In some examples, the plurality of pins of the memory device includes a first subset of pins and a second subset of pins, and, to transmit the signaling, the controller may be configured to cause the apparatus to transmit first signaling indicative of a first logic state over the first subset of pins, and transmit second signaling indicative of a second logic state over the second subset of pins.

In some examples, the first subset of pins may be a single pin and the second subset of pins may be a set of pins.

In some examples, the controller may be configured to cause the apparatus to transmit third signaling indicative of the first logic state over a third subset of the set of pins.

In some examples, the first subset of pins may be a first byte-level subset and the second subset of pins may be a second byte-level subset.

In some examples, the controller may be configured to cause the apparatus to transmit, after transmitting the first signaling and the second signaling, third signaling indicative of the second logic state over the first subset of pins, and transmit, after transmitting the first signaling and the second signaling, fourth signaling indicative of the first logic state over the second subset of pins.

In some examples, the controller may be configured to cause the apparatus to receive, from the host device, a set of one or more commands to write a set of values to a set of mode registers.

In some examples, the signaling of the channel mapping operation may be configured for mapping each of the set of pins of the memory device to a respective information position (e.g., bit position) of the data channel.

In some examples, the controller may be configured to cause the apparatus to transmit the signaling based on a sequence of logic values (e.g., a predefined sequence of logic values, a commanded sequence of logic values).

In some examples, the controller may be configured to cause the apparatus to transmit the signaling according to a slower rate than communicating data with the host device over the data channel.

A system is described. The system may include a memory device including a first set of pins that are associated with a data channel, and a host device, coupled with the memory device, including a second set of pins that are associated with the data channel, and a controller. The controller may be configured to receive signaling from the memory device for a channel mapping operation over one or more of the second set of pins, determine, based on the received signaling, a mapping between a pin of the second set of pins and a respective one of the first set of pins, and communicate information with the memory device via the data channel based on the mapping.

In some examples, the second set of pins includes a first subset of one or more pins and a second subset of one or more pins, and, to receive the signaling from the memory device, the controller may be configured to receive first signaling indicative of a first logic state over the first subset of one or more pins, and receive second signaling indicative of a second logic state over the second subset of one or more pins.

In some examples, to determine the mapping, the controller may be configured to map each respective pin of the second set of pins to a respective information position of the data channel.

In some examples, the controller may be configured to store the mapping to memory included in the host device or to a second memory device coupled with the host device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some cases, may be employed as an electrical contact to a memory cell or other component of a memory array. An electrode may include a trace, wire, conductive line, conductive layer, or the like that provides a conductive path between elements or components of memory array.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, from a memory device, over one or more pins of a host device that are associated with a data channel, signaling for a channel mapping operation;
   determining, for a pin mapper of the host device based at least in part on the received signaling, a mapping between each pin of the one or more pins of the host device and a respective one of a plurality of pins of the memory device, the pin mapper configured to support a dynamic mapping between the one or more pins of the host device and the plurality of pins of the memory device; and
   communicating information via the data channel based at least in part on the determined mapping for the pin mapper of the host device.

2. The method of claim 1, wherein the plurality of pins of the memory device comprises a first subset of one or more pins and a second subset of one or more pins, and determining the mapping comprises:
   determining whether a subset of one or more of the pins of the host device is coupled with the first subset or the second subset.

3. The method of claim 2, wherein the first subset of one or more pins is a first byte-level subset and the second subset of one or more pins is a second byte-level subset, and determining the mapping comprises:
   determining whether a byte-level subset of the pins of the host device corresponds to the first byte-level subset or the second byte-level subset.

4. The method of claim 1, wherein the one or more pins of the host device comprises a first subset of one or more pins and a second subset of one or more pins, and receiving the signaling comprises:
   receiving first signaling indicative of a first logic state over the first subset of one or more pins; and
   receiving second signaling indicative of a second logic state over the second subset of one or more pins.

5. The method of claim 1, wherein determining the mapping comprises:
   mapping each of the plurality of pins of the memory device to a respective information position of the data channel.

6. The method of claim 1, further comprising:
   transmitting, by the host device, command signaling corresponding to a set of mode register values, wherein the received signaling is based at least in part on the set of mode register values.

7. The method of claim 1, wherein determining the mapping comprises:
   identifying respective logic values conveyed by one or more of the plurality of pins of the memory device; and
   comparing the respective logic values of the one or more of the plurality of pins to a sequence of logic values.

8. The method of claim 1, further comprising:
   writing the mapping to memory included in the host device or to a second memory device coupled with the host device.

9. The method of claim 1, wherein the communicating is performed according to a faster signaling rate than the signaling associated with the channel mapping operation.

10. The method of claim 1, further comprising:
    initiating, by the host device, the channel mapping operation.

11. A method, comprising:
    identifying an initialization event for a memory device that includes a plurality of pins associated with a data channel having a plurality of information positions;
    reading one or more mode register values configured for a channel mapping operation based at least in part on identifying the initialization event; and
    transmitting signaling for the channel mapping operation to a host device over the plurality of pins based at least in part on the one or more mode register values, wherein the signaling for the channel mapping operation is configured for a pin mapper of the host device to map each of the plurality of pins to a respective information position of the data channel, the pin mapper configured to support a dynamic mapping between the plurality of pins and the plurality of information positions.

12. The method of claim 11, wherein the plurality of pins of the memory device comprises a first subset of one or more pins and a second subset of one or more pins, and transmitting the signaling comprises:
    transmitting first signaling indicative of a first logic state over the first subset of one or more pins; and transmitting second signaling indicative of a second logic state over the second subset of one or more pins.

13. The method of claim 12, wherein the first subset of one or more pins is a single pin and the second subset of one or more pins is a plurality of pins.

14. The method of claim 12, wherein the first subset of one or more pins is a first byte-level subset and the second subset of one or more pins is a second byte-level sub set.

15. The method of claim 12, wherein transmitting the signaling comprises:
   transmitting, after transmitting the first signaling and the second signaling, third signaling indicative of the second logic state over the first subset of one or more pins; and
   transmitting, after transmitting the first signaling and the second signaling, fourth signaling indicative of the first logic state over the second subset of one or more pins.

16. The method of claim 11, further comprising:
   receiving, from the host device, a set of one or more commands to write a set of values to a set of mode registers.

17. The method of claim 11, wherein the signaling is performed according to a slower signaling rate than communicating data with the host device over the data channel.

18. A system, comprising:
   a memory device comprising a first plurality of pins that are associated with a data channel; and
   a host device, coupled with the memory device, comprising a second plurality of pins that are associated with the data channel, and a controller configured to:
      receive signaling from the memory device for a channel mapping operation over one or more of the second plurality of pins;
      determine, for a pin mapper of the host device based at least in part on the received signaling, a mapping between a pin of the one or more of the second plurality of pins and a respective one of the first plurality of pins, the pin mapper configured to support a dynamic mapping between the first plurality of pins and the second plurality of pins; and
      communicate information with the memory device via the data channel based at least in part on the determined mapping for the pin mapper of the host device.

19. The system of claim 18, wherein the one or more of the second plurality of pins comprises a first subset of one or more pins and a second subset of one or more pins, and, to receive the signaling from the memory device, the controller is configured to:
   receive first signaling indicative of a first logic state over the first subset of one or more pins; and
   receive second signaling indicative of a second logic state over the second subset of one or more pins.

20. The system of claim 18, wherein, to determine the mapping, the controller is configured to:
   map each pin of the one or more of the second plurality of pins to a respective information position of the data channel.

21. The system of claim 18, wherein the controller is configured to:
   store the mapping to memory included in the host device or to a second memory device coupled with the host device.

22. An apparatus, comprising:
   a plurality of first pins of a host device associated with a data channel and configured for electronic communication with a memory device;
   a pin mapper of the host device configured to support a dynamic mapping between the plurality of first pins and a plurality of second pins of the memory device; and
   a controller configured to cause the apparatus to:
      receive, from the memory device, signaling for a channel mapping operation over the plurality of first pins;
      determine, for the pin mapper based at least in part on the received signaling, a mapping between each first pin of the plurality of first pins and a respective one of the plurality of second pins of the memory device; and
      communicate information with the memory device via the data channel based at least in part on the determined mapping for the pin mapper.

23. The apparatus of claim 22, wherein the plurality of second pins of the memory device comprises a first subset of one or more second pins and a second subset of one or more second pins, and, to determine the mapping, the controller is configured to cause the apparatus to:
   determine whether a subset of the plurality of first pins is coupled with the first subset of second pins or the second subset of second pins.

24. The apparatus of claim 22, wherein the plurality of first pins comprises a first subset of first pins and a second subset of first pins, and, to receive the signaling, the controller is configured to cause the apparatus to:
   receive first signaling indicative of a first logic state over the first subset of first pins; and
   receive second signaling indicative of a second logic state over the second subset of first pins.

25. The apparatus of claim 22, wherein the controller is configured to cause the apparatus to:
   transmit command signaling corresponding to a set of mode register values, wherein the received signaling is based at least in part on the set of mode register values.

* * * * *